United States Patent
Moore et al.

(10) Patent No.: US 7,966,481 B2
(45) Date of Patent: Jun. 21, 2011

(54) COMPUTER SYSTEM AND METHOD FOR EXECUTING PORT COMMUNICATIONS WITHOUT INTERRUPTING THE RECEIVING COMPUTER

(75) Inventors: Charles H. Moore, Sierra City, CA (US); Jeffrey Arthur Fox, Berkeley, CA (US); John W. Rible, Santa Cruz, CA (US)

(73) Assignee: VNS Portfolio LLC, Cupertino, CA (US)

( * ) Notice: Subject to any disclaimer, the term of this patent is extended or adjusted under 35 U.S.C. 154(b) by 99 days.

(21) Appl. No.: 11/653,187

(22) Filed: Jan. 12, 2007

(65) Prior Publication Data
US 2007/0226457 A1 Sep. 27, 2007

Related U.S. Application Data

(63) Continuation-in-part of application No. 11/355,513, filed on Feb. 16, 2006, and a continuation-in-part of application No. 11/441,818, filed on May 26, 2006.

(60) Provisional application No. 60/788,265, filed on Mar. 31, 2006, provisional application No. 60/797,345, filed on May 3, 2006, provisional application No. 60/818,084, filed on Jun. 30, 2006, provisional application No. 60/849,498, filed on Sep. 29, 2006.

(51) Int. Cl.
*G06F 9/00* (2006.01)
*G06F 3/00* (2006.01)

(52) U.S. Cl. ............ 712/244; 710/260; 710/39; 710/47; 710/52

(58) Field of Classification Search .................. 712/244, 712/10–22
See application file for complete search history.

(56) References Cited

U.S. PATENT DOCUMENTS

| | | | |
|---|---|---|---|
| 3,757,306 A | 9/1973 | Boone | 340/172.5 |
| 3,868,677 A | 2/1975 | Kidd | |
| 4,107,773 A | 8/1978 | Gilbreath et al. | 364/200 |
| 4,215,401 A | 7/1980 | Holsztynski et al. | |
| 4,215,422 A | 7/1980 | McCray et al. | 364/900 |
| 4,298,932 A | 11/1981 | Sams | 364/200 |
| 4,462,074 A | 7/1984 | Linde | 364/200 |
| 4,589,067 A | 5/1986 | Porter et al. | 364/200 |
| 4,591,980 A | 5/1986 | Huberman et al. | |

(Continued)

FOREIGN PATENT DOCUMENTS

CN 1051995 A 6/1991

(Continued)

OTHER PUBLICATIONS

Rather, E. D., Colburn, D. R., and Moore, C. H. 1993. The evolution of Forth. SIGPLAN Not. 28, 3 (Mar. 1993), 177-199.*

(Continued)

*Primary Examiner* — Eddie P Chan
*Assistant Examiner* — William B Partridge
(74) *Attorney, Agent, or Firm* — Henneman & Associates, PLC; Larry E. Henneman, Jr.

(57) ABSTRACT

A microprocessor system in which an array of processors communicates more efficiently through the use of a worker mode function. Processors that are not currently executing code remain in an inactive but alert state until a task is sent to them by an adjacent processor. Processors can also be programmed to temporarily suspend a task to check for incoming tasks or messages.

35 Claims, 11 Drawing Sheets

U.S. PATENT DOCUMENTS

| | | | |
|---|---|---|---|
| 4,593,351 A | 6/1986 | Hong et al. | |
| 4,665,494 A | 5/1987 | Tanaka et al. | |
| 4,672,331 A | 6/1987 | Cushing | |
| 4,739,474 A * | 4/1988 | Holsztynski | 712/14 |
| 4,742,511 A * | 5/1988 | Johnson | 370/406 |
| 4,789,927 A | 12/1988 | Hannah | |
| 4,821,231 A | 4/1989 | Cruess et al. | 364/900 |
| 4,868,745 A | 9/1989 | Patton et al. | |
| 4,942,517 A | 7/1990 | Cok | |
| 4,943,909 A | 7/1990 | Huang | |
| 4,961,167 A | 10/1990 | Kumanoya et al. | |
| 4,984,151 A | 1/1991 | Dujari | 364/200 |
| 5,021,947 A | 6/1991 | Campbell et al. | |
| 5,029,124 A | 7/1991 | Leahy et al. | |
| 5,053,952 A | 10/1991 | Koopman, Jr. et al. | 364/200 |
| 5,159,338 A | 10/1992 | Takahashi | |
| 5,218,682 A | 6/1993 | Frantz | 395/325 |
| 5,317,735 A | 5/1994 | Schomberg | |
| 5,319,757 A | 6/1994 | Moore et al. | 395/375 |
| 5,359,568 A | 10/1994 | Livay et al. | 365/221 |
| 5,375,238 A | 12/1994 | Ooi | 395/700 |
| 5,377,333 A | 12/1994 | Nakagoshi et al. | |
| 5,386,585 A | 1/1995 | Traylor | |
| 5,390,304 A * | 2/1995 | Leach et al. | 712/241 |
| 5,396,609 A | 3/1995 | Schmidt et al. | 395/425 |
| 5,410,723 A | 4/1995 | Schmidt et al. | 395/800 |
| 5,434,989 A | 7/1995 | Yamaguchi | |
| 5,440,749 A | 8/1995 | Moore et al. | 395/800 |
| 5,475,856 A | 12/1995 | Kogge | |
| 5,485,624 A | 1/1996 | Steinmetz et al. | 395/775 |
| 5,535,393 A | 7/1996 | Reeve et al. | 395/700 |
| 5,535,417 A | 7/1996 | Baji et al. | 395/842 |
| 5,550,489 A | 8/1996 | Raab | |
| 5,551,045 A | 8/1996 | Kawamoto et al. | 395/775 |
| 5,581,767 A | 12/1996 | Katsuki et al. | |
| 5,630,154 A * | 5/1997 | Bolstad et al. | 712/19 |
| 5,649,198 A | 7/1997 | Shibata et al. | |
| 5,657,485 A | 8/1997 | Streitenberger et al. | 395/595 |
| 5,673,423 A | 9/1997 | Hillis | |
| 5,692,197 A | 11/1997 | Narad et al. | 395/750 |
| 5,706,491 A | 1/1998 | McMahan | 395/581 |
| 5,717,943 A | 2/1998 | Barker et al. | 395/800 |
| 5,727,194 A | 3/1998 | Shridhar et al. | 395/588 |
| 5,737,628 A | 4/1998 | Birrittella et al. | |
| 5,740,463 A | 4/1998 | Oshima et al. | |
| 5,752,259 A | 5/1998 | Tran | 711/125 |
| 5,765,015 A | 6/1998 | Wilkinson et al. | |
| 5,784,602 A * | 7/1998 | Glass et al. | 712/220 |
| 5,826,101 A | 10/1998 | Beck et al. | 395/800.34 |
| 5,832,291 A | 11/1998 | Rosen et al. | |
| 5,867,330 A | 2/1999 | Tanaka | |
| 5,893,148 A | 4/1999 | Genduso et al. | 711/132 |
| 5,911,082 A | 6/1999 | Monroe et al. | 395/800.35 |
| 5,937,202 A * | 8/1999 | Crosetto | 712/19 |
| 5,944,814 A | 8/1999 | McCulloch et al. | |
| 6,003,128 A | 12/1999 | Tran | 712/241 |
| 6,023,753 A | 2/2000 | Pechanek et al. | 712/18 |
| 6,038,655 A | 3/2000 | Little et al. | 712/32 |
| 6,057,791 A | 5/2000 | Knapp | |
| 6,081,215 A | 6/2000 | Kost et al. | |
| 6,085,304 A | 7/2000 | Morris et al. | 712/22 |
| 6,092,183 A | 7/2000 | Takewa et al. | |
| 6,094,030 A | 7/2000 | Gunthorpe et al. | |
| 6,101,598 A | 8/2000 | Dokic et al. | 712/227 |
| 6,112,296 A | 8/2000 | Witt et al. | 712/222 |
| 6,145,072 A | 11/2000 | Shams et al. | 712/22 |
| 6,148,392 A | 11/2000 | Liu | 712/202 |
| 6,154,809 A | 11/2000 | Ikenaga et al. | 711/108 |
| 6,173,389 B1 | 1/2001 | Pechanek et al. | 712/24 |
| 6,178,525 B1 | 1/2001 | Warren | 714/37 |
| 6,192,388 B1 | 2/2001 | Cajolet | |
| 6,219,685 B1 | 4/2001 | Story | 708/498 |
| 6,223,282 B1 | 4/2001 | Kang | 712/241 |
| 6,232,905 B1 | 5/2001 | Smith et al. | |
| 6,233,670 B1 | 5/2001 | Ikenaga et al. | |
| 6,236,645 B1 | 5/2001 | Agazzi | |
| 6,279,101 B1 | 8/2001 | Witt et al. | 712/215 |
| 6,307,425 B1 | 10/2001 | Chevallier et al. | |
| 6,308,229 B1 | 10/2001 | Masteller | |
| 6,353,880 B1 | 3/2002 | Cheng | |
| 6,367,005 B1 | 4/2002 | Zahir et al. | 712/228 |
| 6,381,705 B1 | 4/2002 | Roche | 713/601 |
| 6,388,600 B1 | 5/2002 | Johnson et al. | |
| 6,404,274 B1 | 6/2002 | Hosono et al. | |
| 6,404,663 B2 | 6/2002 | Shinozaki | |
| 6,427,204 B1 | 7/2002 | Arimilli et al. | 712/206 |
| 6,449,709 B1 | 9/2002 | Gates | 712/202 |
| 6,460,128 B1 | 10/2002 | Baxter et al. | 712/11 |
| 6,502,141 B1 | 12/2002 | Rawson, III | |
| 6,507,649 B1 | 1/2003 | Tovander | 379/230 |
| 6,507,947 B1 | 1/2003 | Schreiber et al. | |
| 6,522,282 B1 | 2/2003 | Elbornsson | |
| 6,542,105 B2 | 4/2003 | Sakuragi | |
| 6,560,716 B1 | 5/2003 | Gasparik et al. | |
| 6,598,148 B1 | 7/2003 | Moore et al. | 712/32 |
| 6,636,122 B2 | 10/2003 | Tsyrganovich | |
| 6,647,027 B1 | 11/2003 | Gasparik et al. | |
| 6,657,462 B2 | 12/2003 | Dobberpuhl | |
| 6,665,793 B1 | 12/2003 | Zahir et al. | 712/228 |
| 6,671,112 B2 | 12/2003 | Murakami et al. | |
| 6,725,361 B1 | 4/2004 | Rozas et al. | 712/222 |
| 6,732,253 B1 | 5/2004 | Redford | |
| 6,825,843 B2 | 11/2004 | Allen et al. | 345/522 |
| 6,826,674 B1 | 11/2004 | Sato | 712/200 |
| 6,845,412 B1 | 1/2005 | Boike et al. | 710/36 |
| 6,898,721 B2 | 5/2005 | Schmidt | |
| 6,930,628 B2 | 8/2005 | Reinhold et al. | |
| 6,937,538 B2 | 8/2005 | Terzioglu et al. | |
| 6,959,372 B1 | 10/2005 | Hobson et al. | 711/168 |
| 6,966,002 B1 | 11/2005 | Torrubia-Saez | |
| 6,970,895 B2 | 11/2005 | Vaidyanathan et al. | |
| 7,028,163 B2 | 4/2006 | Kim et al. | 712/202 |
| 7,079,046 B2 | 7/2006 | Tanaka | 340/870.07 |
| 7,084,793 B2 | 8/2006 | Elbornsson | |
| 7,089,438 B2 | 8/2006 | Raad | |
| 7,131,113 B2 | 10/2006 | Chang et al. | |
| 7,136,989 B2 | 11/2006 | Ishii | 712/23 |
| 7,155,602 B2 | 12/2006 | Poznanovic | 713/1 |
| 7,157,934 B2 | 1/2007 | Teifel et al. | |
| 7,162,573 B2 | 1/2007 | Mehta | |
| 7,197,624 B2 | 3/2007 | Pechanek et al. | 712/11 |
| 7,249,357 B2 | 7/2007 | Landman et al. | |
| 7,255,476 B2 | 8/2007 | Franch et al. | |
| 7,263,624 B2 | 8/2007 | Marchand et al. | |
| 7,265,640 B1 | 9/2007 | Nix | |
| 7,269,805 B1 | 9/2007 | Ansari et al. | 716/4 |
| 7,319,355 B2 | 1/2008 | Wu et al. | |
| 7,380,100 B2 | 5/2008 | Shimura et al. | |
| 7,386,689 B2 | 6/2008 | Kirsch | |
| 7,403,055 B2 | 7/2008 | Minzoni | |
| 7,471,643 B2 | 12/2008 | Stansfield | |
| 7,512,728 B2 | 3/2009 | Tseng | |
| 7,528,756 B2 | 5/2009 | Moore et al. | |
| 2002/0004912 A1 | 1/2002 | Fung | |
| 2002/0010844 A1 | 1/2002 | Noel et al. | 711/153 |
| 2002/0019951 A1 | 2/2002 | Kubo et al. | |
| 2002/0186159 A1 | 12/2002 | Reinhold et al. | |
| 2003/0005168 A1 | 1/2003 | Leerssen et al. | |
| 2003/0009502 A1 | 1/2003 | Katayanagi | |
| 2003/0028750 A1 | 2/2003 | Hogenauer | 712/10 |
| 2003/0035549 A1 | 2/2003 | Bizjak et al. | |
| 2003/0065905 A1 | 4/2003 | Ishii | |
| 2003/0113031 A1 | 6/2003 | Wal | |
| 2003/0135710 A1 | 7/2003 | Farwell et al. | |
| 2003/0179123 A1 | 9/2003 | DeVilbiss | |
| 2003/0217242 A1 | 11/2003 | Wybenga et al. | 711/163 |
| 2004/0003219 A1 | 1/2004 | Uehara | 712/241 |
| 2004/0030859 A1 | 2/2004 | Doerr et al. | |
| 2004/0059895 A1 | 3/2004 | May et al. | 712/223 |
| 2004/0095264 A1 | 5/2004 | Thomas | |
| 2004/0098707 A1 | 5/2004 | Tang et al. | |
| 2004/0107332 A1 | 6/2004 | Fujii et al. | 712/16 |
| 2004/0143638 A1 | 7/2004 | Beckmann et al. | 709/212 |
| 2004/0215929 A1* | 10/2004 | Floyd et al. | 712/16 |
| 2004/0250046 A1 | 12/2004 | Gonzalez et al. | |
| 2005/0015572 A1 | 1/2005 | Tanaka et al. | |
| 2005/0027548 A1 | 2/2005 | Jacobs et al. | |

| | | | |
|---|---|---|---|
| 2005/0034029 A1 | 2/2005 | Ramberg et al. | |
| 2005/0114565 A1 | 5/2005 | Gonzalez et al. | 710/36 |
| 2005/0149693 A1* | 7/2005 | Barry | 712/34 |
| 2005/0182581 A1 | 8/2005 | Hashemian | |
| 2005/0196060 A1 | 9/2005 | Wang et al. | |
| 2005/0206648 A1 | 9/2005 | Perry et al. | |
| 2005/0223204 A1 | 10/2005 | Kato | 712/241 |
| 2005/0228904 A1 | 10/2005 | Moore | |
| 2005/0237083 A1 | 10/2005 | Bakker et al. | |
| 2005/0257037 A1 | 11/2005 | Elwood et al. | |
| 2005/0262278 A1 | 11/2005 | Schmidt | |
| 2006/0059377 A1 | 3/2006 | Sherburne | |
| 2006/0082445 A1 | 4/2006 | O'Toole et al. | |
| 2006/0097901 A1 | 5/2006 | Draxelmayr et al. | |
| 2006/0101238 A1 | 5/2006 | Bose et al. | 712/206 |
| 2006/0149925 A1 | 7/2006 | Nguyen et al. | 712/23 |
| 2006/0212867 A1 | 9/2006 | Fields et al. | |
| 2006/0218375 A1 | 9/2006 | Swarztrauber | |
| 2006/0224831 A1 | 10/2006 | Yoshikawa | |
| 2006/0248317 A1 | 11/2006 | Vorbach et al. | 712/221 |
| 2006/0248360 A1 | 11/2006 | Fung | |
| 2006/0259743 A1 | 11/2006 | Suzuoki | |
| 2006/0271764 A1 | 11/2006 | Nilsson et al. | |
| 2006/0279445 A1 | 12/2006 | Kinyua et al. | |
| 2006/0279969 A1 | 12/2006 | Leung et al. | |
| 2006/0279970 A1 | 12/2006 | Kernahan | |
| 2007/0035611 A1 | 2/2007 | Wu | |
| 2007/0036150 A1 | 2/2007 | Pounds et al. | |
| 2007/0041438 A1 | 2/2007 | Mogi et al. | |
| 2007/0070079 A1 | 3/2007 | Chung et al. | |
| 2007/0113058 A1 | 5/2007 | Tran et al. | 712/241 |
| 2007/0153953 A1 | 7/2007 | Garzarolli et al. | |
| 2007/0192504 A1 | 8/2007 | Moore | |
| 2007/0192566 A1 | 8/2007 | Moore et al. | |
| 2007/0192570 A1 | 8/2007 | Moore | |
| 2007/0192575 A1 | 8/2007 | Moore et al. | |
| 2007/0192646 A1 | 8/2007 | Moore | |
| 2007/0226457 A1 | 9/2007 | Moore et al. | |
| 2008/0270648 A1 | 10/2008 | Rible | |
| 2008/0270751 A1 | 10/2008 | Montvelishsky et al. | |

FOREIGN PATENT DOCUMENTS

| | | |
|---|---|---|
| DE | 3937807 | 5/1990 |
| EP | 0156654 | 10/1985 |
| EP | 0227319 | 7/1987 |
| EP | 0724221 A2 | 7/1996 |
| EP | 0992896 | 4/2000 |
| EP | 1182544 | 2/2002 |
| GB | 2154343 A | 9/1985 |
| GB | 2299422 A | 10/1996 |
| JP | 60-183645 | 9/1985 |
| JP | 3-500585 | 2/1991 |
| JP | 5-81216 | 4/1993 |
| JP | 6-243113 | 9/1994 |
| JP | 2509678 | 4/1996 |
| JP | 8-161282 | 6/1996 |
| JP | 8-288768 | 11/1996 |
| KR | 10-1999-0036970 | 5/1999 |
| KR | 10-2005-0112523 | 11/2005 |
| KR | 10-2007-0048540 | 5/2007 |
| KR | 10-2007-0052461 | 5/2007 |
| WO | WO97/15001 | 4/1997 |
| WO | WO00/42506 | 7/2000 |
| WO | WO02/12999 | 2/2002 |
| WO | WO02/50700 | 6/2002 |
| WO | WO02/088936 | 11/2002 |
| WO | WO03/019356 | 3/2003 |
| WO | WO2005/091847 | 10/2005 |

OTHER PUBLICATIONS

*Ambric's New Parallel Processor; Globally Asynchronous Architecture Eases Parallel Programming*; Tom R. Halfhill; Microprocessor Report, Scottsdale, AZ; Oct. 10, 2006; pp. 1-9.
*An Asynchronous Array of Simple Processors for DSP Applications*; Zhiyi et al., Yu; IEEE International Conference Digest of Technical Papers, Feb. 6-9, 2006; pp. 1696-1705.
*An Improved Dynamic Register Array Concept for High-Performance RISC Processors*; Scholz, T. et al.; IEEE; 1995; pp. 181-190.
*An Instruction Buffer for Low-Power DSP*; Brackenbury, M. L. L.; Advanced Research In Asynchronous Circuits and Systems, 2000 (ASYNC 2000) Proceedings, Sixth international Symposium on Eilat, Israel, Apr. 2-6, 2000; Los Alamitos, CA, USA; IEEE Comput. Soc., US; Apr. 2, 2000, pp. 176-186.
*An Ultra Low-Power Processor for Sensor Networks*; Ekanayake et al., V.; Sigplan Notices ACM, vol. 39, No. 11, Nov. 2004; pp. 27-36.
*BitSNAP: Dynamic Significance Compression for a Low-Energy Sensor Network Asynchronous Processor*; Ekanayake et al., V.N.; Asynchronous Circuits & Systems, Mar. 14-16, 2005; pp. 144-154.
*Computer Archtecture: a Quantitative Approach*; Hennessy et al., John L.; Morgan Kaufmann Publishers, 3$^{rd}$ Edition, 2003; p. 98.
*Connection Machine Model CM-5 System Overview*; Palmer et al., Thinking Machine Corp., Cambridge, Mass., IEEE Jul. 1992, pp. 474-483.
*Datawave: A Single-Chip Multiprocessor for Video Applications*; Schmidt et al., U.; IEEE Micro, IEEE Service Center, vol. 11, No. 3, Jun. 1, 1991; pp. 22-25, 88.
*Energy Characterization of a Tiled Architecture Processor with On-Chip Networks*; Kim, J.S.; Proceedings of the 2003 International Symposium on Low Power Electronics & Design, Aug. 25-27, 2003; pp. 424-427.
*Enhanced Serial Port on the 83C51FA*, Intel, Nov. 1987.
*Flits: Pervasive Computing for Processor and Memory Constrained Systems*, Majurski et al., NIST, pp. 31-38; not dated.
*Functionally Asynchronous Array Processor for Morphological Filtering of Greyscale Images*; Robin et al., F.; IEEE Proceedings: Computers and Digital Techniques, vol. 143, No. 5, Sep. 24, 1996; pp. 273-281.
*IEEE Standard for Boot (Initialization Configuration) Firmware: Core Requirements and Practices*, IEEE Std 1275; 1994.
*Introduction to Java's Architecture*, Bill Venners, Artima.com; Jan. 8, 1999, pp. 1-10.
*Itanium Processor Microarchitecture*; Sharangpani, H. et al.: IEEE; 2000; pp. 24-43.
*iWarp: A 100-MPOS, LIW Microprocessor for Multicomputers*; Peterson et al.; IEEE Micro; IEEE Service Center, Los Alamitos, CA; vol. 11, No. 3, Jun. 1, 1991; pp. 26-29, 81-87.
*Low-Power Electronics Design*; Piguet, Christian; CRC Press, 2005, pp. 7-1-7-18.
*M68HC11 Microcontrollers Reference Manual*, Motorola, Rev. 6, Apr. 2002, p. 29-31, 46, 203,234, 549.
*Stack Computers: The New Wave*; Koopman, Jr.; Philip; Mountain View Press, La Honda, CA; 1989; pp. 1-232.
*Teilzeitarbeit im Prozessor*; Frees, W.; Electronik, WEKA Fachzeitschriftenverlag, Poing, DE, vol. 45, No. 9, Apr. 30, 1996; pp. 100-106.
*The Architecture of the SC32 Forth Engine*; Hayes et al.; Journal of Forth Application and Research, Institute for Applied Forth Research; Rochester, US; vol. 5, No. 4, 1989, pp. 493-506 (pp. 500-501 Fig 3).
*The Computer Engineering Handbook*; Oklobdzija, Vojin G.; CRC Press, 2002; Chapter 7: Architectures for Low Power.
*The PASM Project: A Study of Reconfigurable Parallel Computing*; Siegel et al., H.J.; Parallel Architectures, Algorithms and Networks, Jun. 12-14, 1996; pp. 529-536.
*The Raw Microprocessor: A Computational Fabric for Software Circuits and General-Purpose Programs*; Agarwal et al.; IEEE Micro; IEEE, Service Center, Los Alamitos, CA; vol. 22, No. 2, Mar. 1, 2002, pp. 25-35.
*VBScript Looping Statements*; W3Schools; www.w3schools.com/vbscript/vbsript_looping.asp; Jul. 2000.
XP-002488692 (*2.1.3 Adressierungsarten und Befehlsformate*); Flik, T.; 2 Der Mikroprozessortechnik; 2001, Springer, Berlin; ISBN: 3-540-42042-8; pp. 76-84.
*8Xc251SB Embedded Microcontroller User's Manual*, Intel, Feb. 1995, pp. 1-9, 9-438, and sections 9-1 to 9-4.
*Teilzeitarbeit im Prozessor (Processor time-sharing)*; Frees, W.; Electronik, WEKA Fachzeitschriftenverlag, Poing, DE; vol. 45, No. 9; Apr. 30, 1996; pp. 100-106 (English Translation).
EP Application No. 07250647.0-2211, Extended European Search Report dated May 21, 2008.
U.S. Appl. No. 10/365,089, filed Feb. 12, 2003, Swarztrauber.

*A Digital Background Calibration Technique for Time-Interleaved Analog-To-Digital Converters*, Daihong Fu et al.; IEEE Journal of Solid-State Circuits, vol. 33, No. 12, Dec, 1998.
*Analog to Digital Conversion: Technical Aspects*; Loumeau et al.; Annales des Telecommunications, vol. 57, Nos. 5-6; Jun. 3, 2002; pp. 338-385.
*Analog/RF Circuit Design Techniques for Nanometerscale IC Technologies*; Nauta et al.; Proceedings of the 31$^{st}$ European Solid-State Circuits Conf, 2005; Sep. 12, 2005; pp. 45-53.
*ASPRO-216: A Standard-Cell Q.D.I. 16-Bit RISC Asynchronous Microprocessor*; Renaudin et al.;Proceedings. International Symposium on Advanced Research in Asychronous Circuits and Systems; Jan. 1, 1989, pp. 2231.
*B16—Ein Forth Prozessor im FPGA*; Paysan; INET (Online); Feb. 2, 2003, XP002490986; Retreived from the Internet: url:http://www.jwdt.com/ {paysan/b16.pdf> p. 1.
*C18 Colorforth Compiler*; Chuck Moore; Euroforth 2001 (Online); Nov. 26, 2001,XP002490985, Schloss Dagstuhl, Saarland, Germany; Retreived from the Internet:url:http://www.complang.tuwien.ac.at/anton/euroforth/ef01/moore01a.pdf> pp. 1.
Capturing Data from Gigasample Analog-to-Digital Converters; King, I/O Magazine; Jan. 2006.
*CMOS Digital Integrated Circuits*, Kang et al., 1999, McGraw-Hill, 2$^{nd}$ edition, pp. 549-550.
*Design of a High-Performance Analog-to-Digital Converter*; Nary, Kevin; dated Mar. 22, 2007.
*Evolvable Platform for Array Processing: A One-Chip Approach*, Girau et al., Microelectronics for Neural, Fuzzy and Bio-Inspired Systems, 1999. MIC Roneuro '99. Proceedings of the Seventh International Conference on Granada, Spain, Apr. 7-9, 1999,Los Alamitos, CA(US) IEEE Computer Soc, US, Apr. 7, 1999, pp. 187-193, XP010329509.
*Field Programmable Processor Arrays*, Nussbaum et al., Evolvable Systems: From Biology to Hardware. Second International Conference, ICES 98 Proceedings, Springer-VerlagBerlin, DE, 1998, pp. 311-322, XP002536744.
*Microchip, PIC18F6585/8585/6680/8680 Data Sheet*, Microchip Technology Inc., 2004;pp. 1-31, 229-248.
*Mikroprozessortechnik—*, Flik, 2001, Springer Verlag, Berlin, p. 528-533, figures 8-5a, ISBN: 3-540-42042-8; German Translation.
*Performance and Power Analysis of Globally Asynchronous Locally Synchronous Multi-Processor Systems*, Zhiyi Yu et al., Emerging VLSI Technologies and Architectures, 2006. IEEE Computer Society Annual Symposium on Klarlsruhe, Germany, Mar. 2-3, 2006, Piscataway, NJ, USA, IEEE, Mar. 2, 2006 pp. 378-383.
*Use IRAM for Rasterization*, Kang Y et al., Image Processing, 1998, ICIP 98 Proceedings, 1998; International Conference on Chicago, IL, USA. Oct. 4-7, 1998, Los Alamitos, CA, USA, IEEE Comput. Soc. US, vol. 3,Oct. 4, 1998, pp. 1010-1013.
*White Paper on Parallel Successive Approximation ADC*; Elbornsson, PhD., MathCoreEngineering AB; Oct. 18, 2005.
*25x Emulator*; Chuck Moore; Euroforth 2001 (Online); Nov. 26, 2001, XP002490984 Schloss Dagstuhl, Saarland, Germany; Retreived from the Internet: p. 2, para 8; url:http://www.complang.tuwien.ac.at/anton/euroforth/ef01/moore01b.pdf.
PCT Application No. PCT/US2007/004082, International Search Report and Written Opinion dated Nov. 10, 2008.
PCT Application No. PCT/US2007/004082, International Preliminary Report on Patentability dated Dec. 31, 2008.
EP Application No. 07250647.0, Partial European Search Report dated Jul. 3, 2007.
EP Application No. 07250647.0, Extended European Search Report dated May 21, 2008.
EP Application No. 07250647.0, Office Action dated Jan. 9, 2009.
U.S. Appl. No. 10/801,942, Office Action dated May 15, 2006.
U.S. Appl. No. 10/801,942, Office Action dated Jan. 29, 2007.
U.S. Appl. No. 10/801,942, Office Action dated Aug. 8, 2007.
U.S. Appl. No. 10/801,942, Interview Summary dated Nov. 14, 2007.
U.S. Appl. No. 10/801,942, Office Action dated Jun. 19, 2008.
U.S. Appl. No. 10/801,942, Office Action dated Mar. 10, 2009.
U.S. Appl. No. 10/801,942, Office Action dated May 20, 2010.
U.S. Appl. No. 10/801,942, Notice of Allowance dated Nov. 10, 2010.
PCT Application No. PCT/US2005/005140, International Search Report and Written Opinion dated Jun. 17, 2008.
PCT Application No. PCT/US2005/005140, International Preliminary Report on Patentability dated Mar. 5, 2009.
CN Application No. 200580008575.7, Office Action dated Mar. 15, 2010 (English translation).
EP Application No. 05723250.6, European Search Report dated Jul. 31, 2009.
EP Application No. 05723250.6, Office Action dated Mar. 19, 2010.
EP Application No. 05723250.6, Office Action dated Sep. 7, 2010.
JP Application No. 2007-503910, Office Action dated Sep. 2, 2009 (English translation).
U.S. Appl. No. 11/810,183, Office Action dated Jun. 23, 2008.
U.S. Appl. No. 11/810,183, Office Action dated Mar. 31, 2009.
U.S. Appl. No. 11/810,183, Notice of Allowance dated Jul. 27, 2010.
U.S. Appl. No. 11/355,495, Office Action dated Oct. 3, 2007.
U.S. Appl. No. 11/355,495, Office Action dated Jun. 10, 2008.
U.S. Appl. No. 11/355,495, Interview Summary dated Nov. 18, 2008.
U.S. Appl. No. 11/355,495, Office Action dated Feb. 2, 2009.
U.S. Appl. No. 11/355,495, Office Action dated Sep. 24, 2009.
U.S. Appl. No. 11/355,495, Office Action dated Apr. 20, 2010.
U.S. Appl. No. 11/355,495, Interview Summary dated Sep. 29, 2010.
U.S. Appl. No. 11/355,495, Notice of Allowance dated Nov. 2, 2010.
PCT Application No. PCT/US2007/004031, International Search Report and Written Opinion dated Jul. 7, 2008.
PCT Application No. PCT/US2007/004031, International Preliminary Report on Patentability dated Aug. 28, 2008.
EP Application No. 07250648.8, European Search Report dated May 21, 2007.
EP Application No. 07250648.8, Office Action dated Feb. 14, 2008.
EP Application No. 07250648.8, Office Action dated Jul. 15, 2009.
U.S. Appl. No. 11/355,513, Office Action dated Sep. 25, 2008.
U.S. Appl. No. 11/355,513, Office Action dated May 1, 2009.
U.S. Appl. No. 11/355,513, Office Action dated Dec. 28, 2009.
U.S. Appl. No. 11/355,513, Office Action dated Jul. 22, 2010.
U.S. Appl. No. 11/355,513, Interview Summary dated Oct. 12, 2010.
U.S. Appl. No. 11/355,513, Notice of Allowance dated Nov. 3, 2010.
PCT Application No. PCT/US2007/004080, International Search Report and Written Opinion dated May 5, 2008.
PCT Application No. PCT/US2007/004080, International Preliminary Report on Patentability dated Aug. 28, 2008.
CN Application No. 200780000014.1, Office Action dated Jul. 24, 2009 (English translation).
EP Application No. 07250645.4, European Search Report dated Jun. 27, 2007.
EP Application No. 07250645.4, Office Action dated Feb. 14, 2008.
EP Application No. 07250645.4, Notice of Allowance dated Oct. 21, 2009.
U.S. Appl. No. 11/441,784, Restriction Requirement dated Aug. 21, 2007.
U.S. Appl. No. 11/441,784, Office Action dated Nov. 27, 2007.
U.S. Appl. No. 11/441,784, Office Action dated Feb. 19, 2008.
U.S. Appl. No. 11/441,784, Office Action dated Nov. 7, 2008.
U.S. Appl. No. 11/441,784, Interview Summary dated Nov. 9, 2009.
U.S. Appl. No. 11/441,784, Notice of Allowance dated Jan. 27, 2010.
U.S. Appl. No. 11/441,784, Office Action dated Mar. 17, 2010.
U.S. Appl. No. 11/441,784, Amendment Considered Notice dated Apr. 15, 2010.
PCT Application No. PCT/US2007/004030, International Search Report and Written Opinion dated Nov. 10, 2008.
PCT Application No. PCT/US2007/004030, International Preliminary Report on Patentability dated Dec. 18, 2008.
CN Application No. 200780000013.7, Office Action dated Mar. 30, 2010 (English translation).
EP Application No. 07250649.6, Extended European Search Report dated Jul. 2, 2007.
EP Application No. 07250649.6, Office Action dated Feb. 14, 2008.
EP Application No. 07250649.6, Office Action dated Jan. 29, 2010.
EP Application No. 07250649.6, Notice of Allowance dated Jul. 26, 2010.
U.S. Appl. No. 12/803,652, Office Action dated Sep. 22, 2010.
U.S. Appl. No. 11/441,812, Office Action dated Aug. 21, 2007.

U.S. Appl. No. 11/441,812, Restriction Requirement dated Jul. 10, 2008.
U.S. Appl. No. 11/441,812, Office Action dated Apr. 2, 2009.
U.S. Appl. No. 11/441,812, Office Action dated Jan. 15, 2010.
U.S. Appl. No. 11/441,812, Notice of Allowance dated Oct. 21, 2010.
PCT Application No. PCT/US2007/004029, International Search Report and Written Opinion dated Aug. 25, 2008.
PCT Application No. PCT/US2007/004029, International Preliminary Report on Patentability dated Sep. 18, 2008.
CN Application No. 200780000015.6, Office Action dated Dec. 18, 2009 (English translation).
EP Application No. 07250614.0, European Search Report dated Jun. 13, 2007.
EP Application No. 07250614.0, Office Action dated Feb. 18, 2008.
EP Application No. 07250614.0, Office Action dated Jan. 29, 2010.
U.S. Appl. No. 11/441,818, Office Action dated Sep. 5, 2007.
U.S. Appl. No. 11/441,818, Office Action dated Jul. 10, 2008.
U.S. Appl. No. 11/441,818, Office Action dated Apr. 1, 2009.
U.S. Appl. No. 11/441,818, Office Action dated Jan. 5, 2010.
PCT Application No. PCT/US2007/004083, International Search Report and Written Opinion dated Sep. 4, 2008.
PCT Application No. PCT/US2007/004083, International Preliminary Report on Patentability dated Mar. 12, 2009.
EP Application No. 07250646.2, Partial European Search Report dated Jul. 24, 2007.
EP Application No. 07250646.2, Extended European Search Report dated Aug. 25, 2008.
EP Application No. 07250646.2, Office Action dated May 5, 2009.
U.S. Appl. No. 11/741,649, Office Action dated May 12, 2008.
U.S. Appl. No. 11/741,649, Notice of Allowance dated Feb. 27, 2009.
PCT Application No. PCT/US2008/005336, International Search Report and Written Opinion dated Oct. 9, 2008.
PCT Application No. PCT/US2008/005336, International Preliminary Report on Patentability dated Dec. 28, 2009.
EP Application No. 08251505.7, European Search Report dated Aug. 4, 2008.
EP Application No. 08251505.7, Office Action dated Jul. 15, 2009.
U.S. Appl. No. 11/741,659, Office Action dated Dec. 29, 2008.
U.S. Appl. No. 11/741,659, Office Action dated Sep. 16, 2009.
U.S. Appl. No. 11/741,659, Notice of Allowance dated Jun. 9, 2010.
PCT Application No. PCT/US2008/005335, International Search Report and Written Opinion dated Dec. 8, 2008.
PCT Application No. PCT/US2008/005335, International Preliminary Report on Patentability dated May 29, 2009.
EP Application No. 08251499.3, European Search Report dated Aug. 13, 2008.
EP Application No. 08251499.3, Office Action dated May 20, 2009.

* cited by examiner

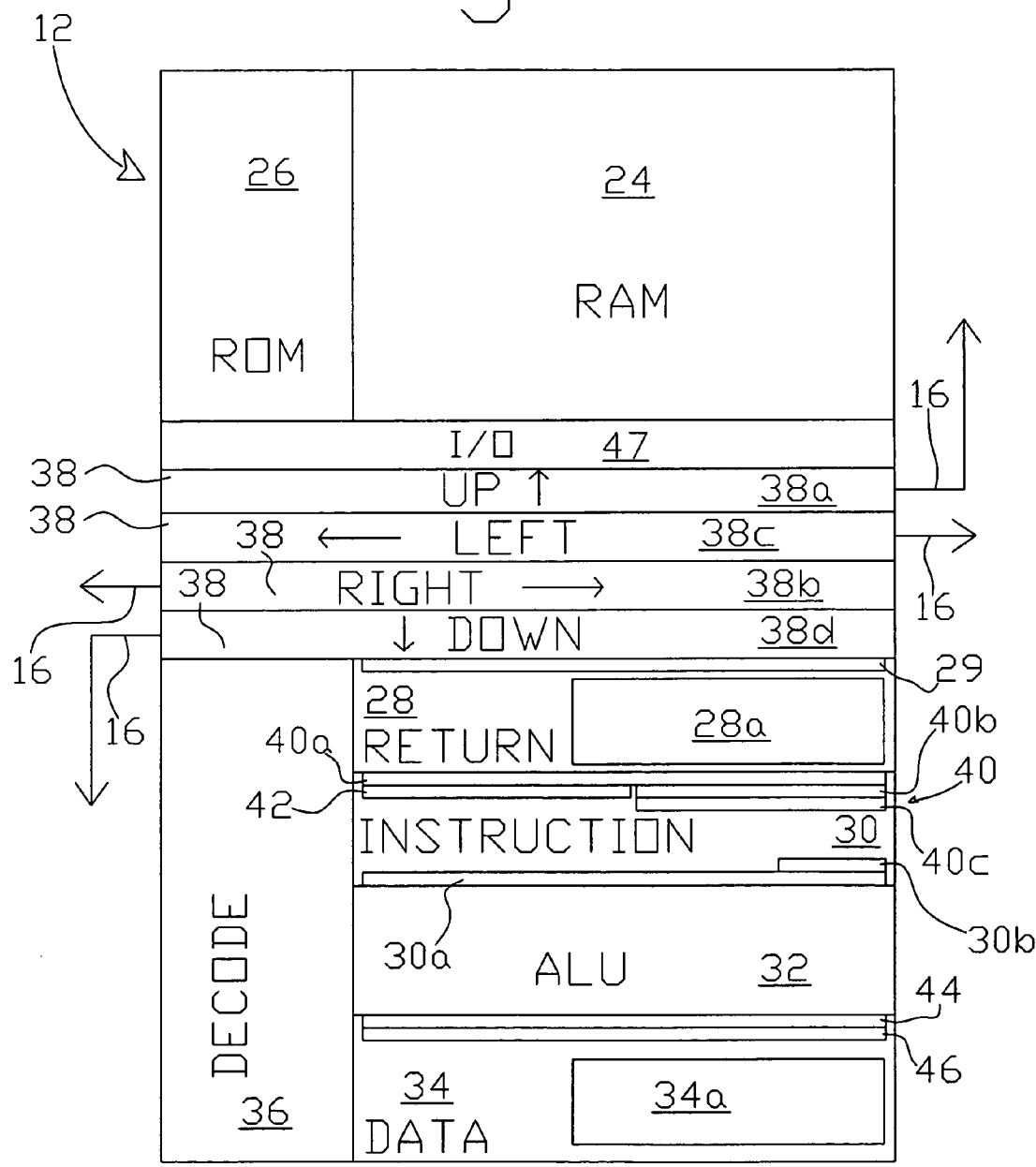

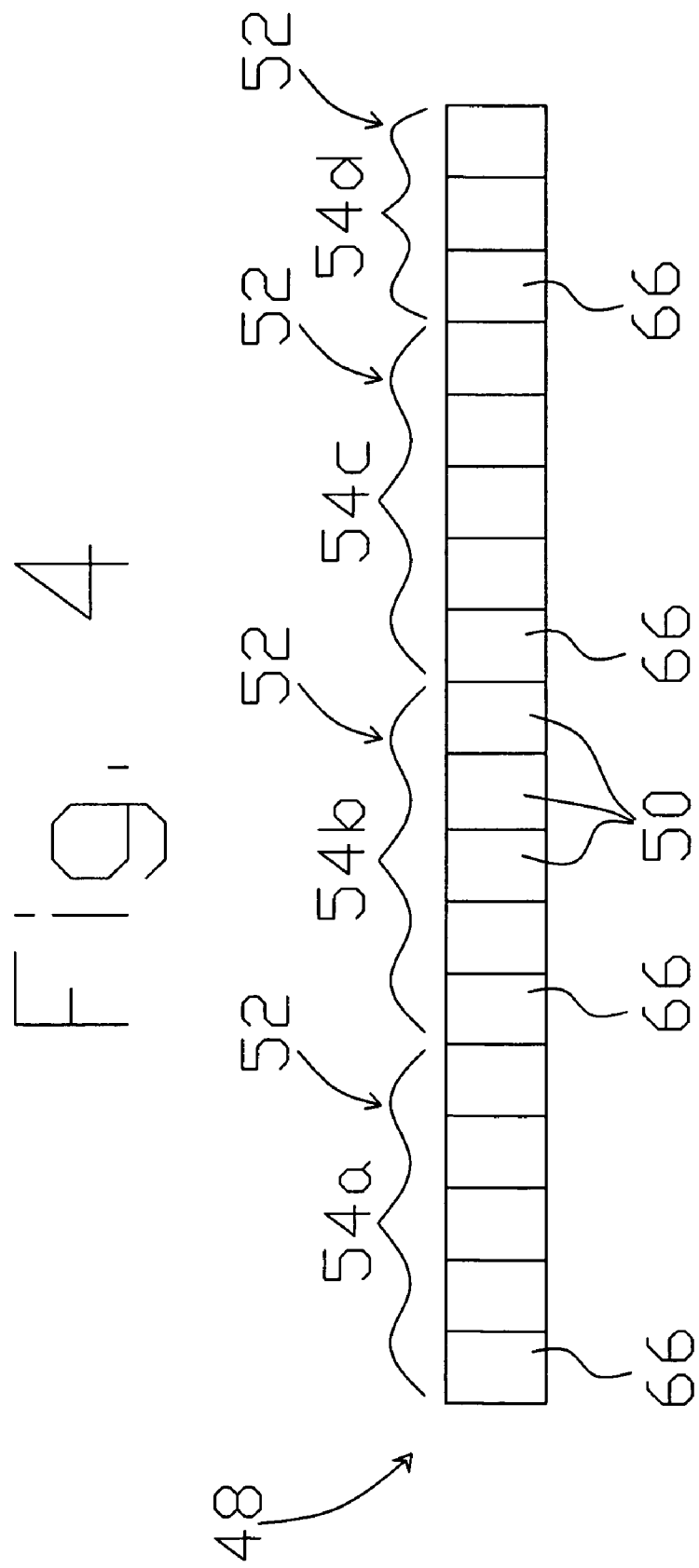

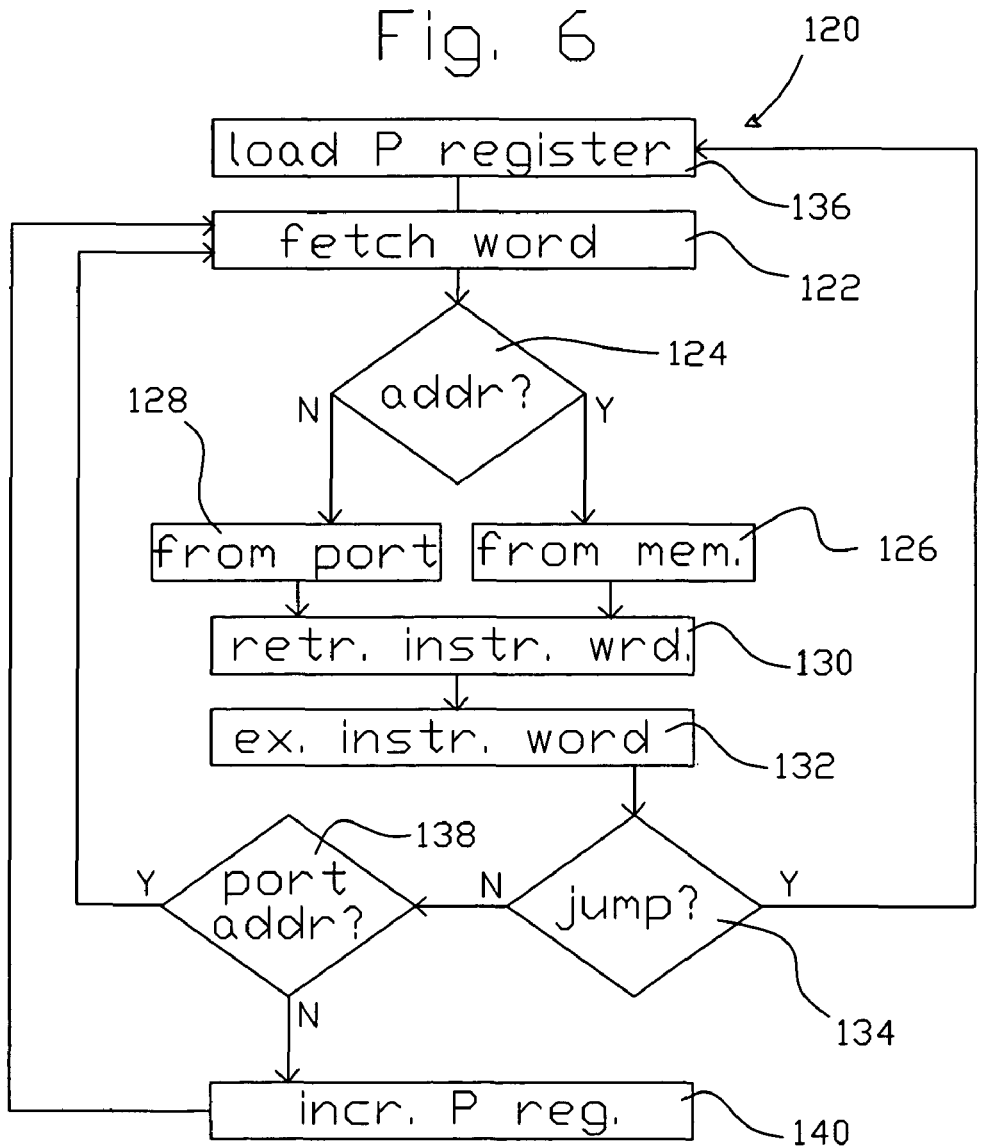
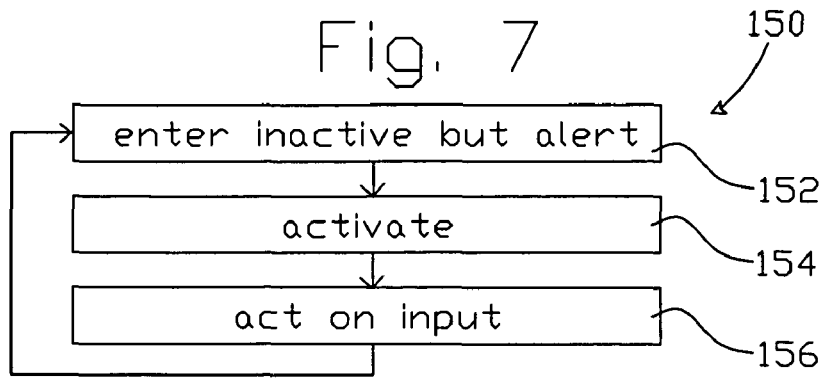

Fig. 9a
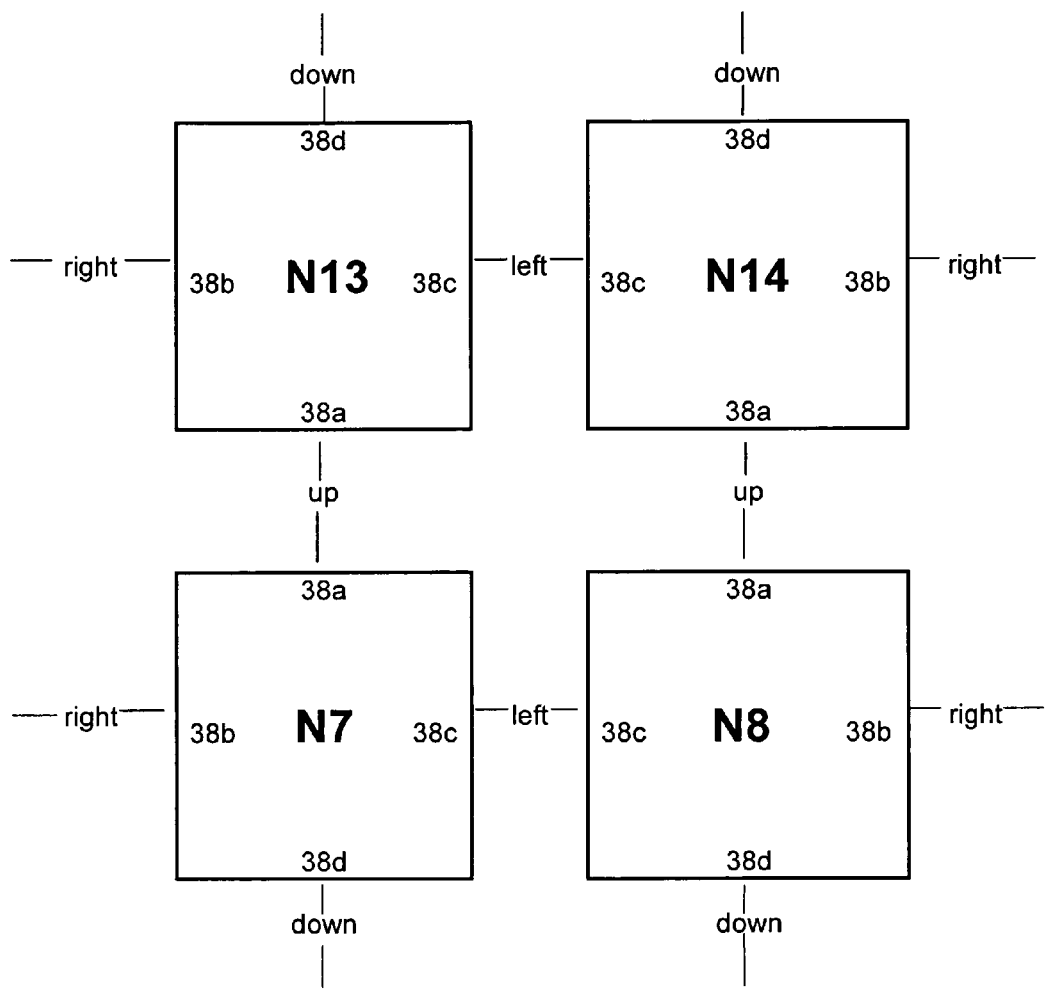
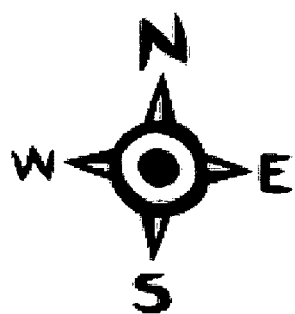
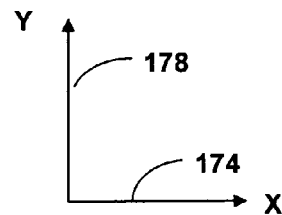

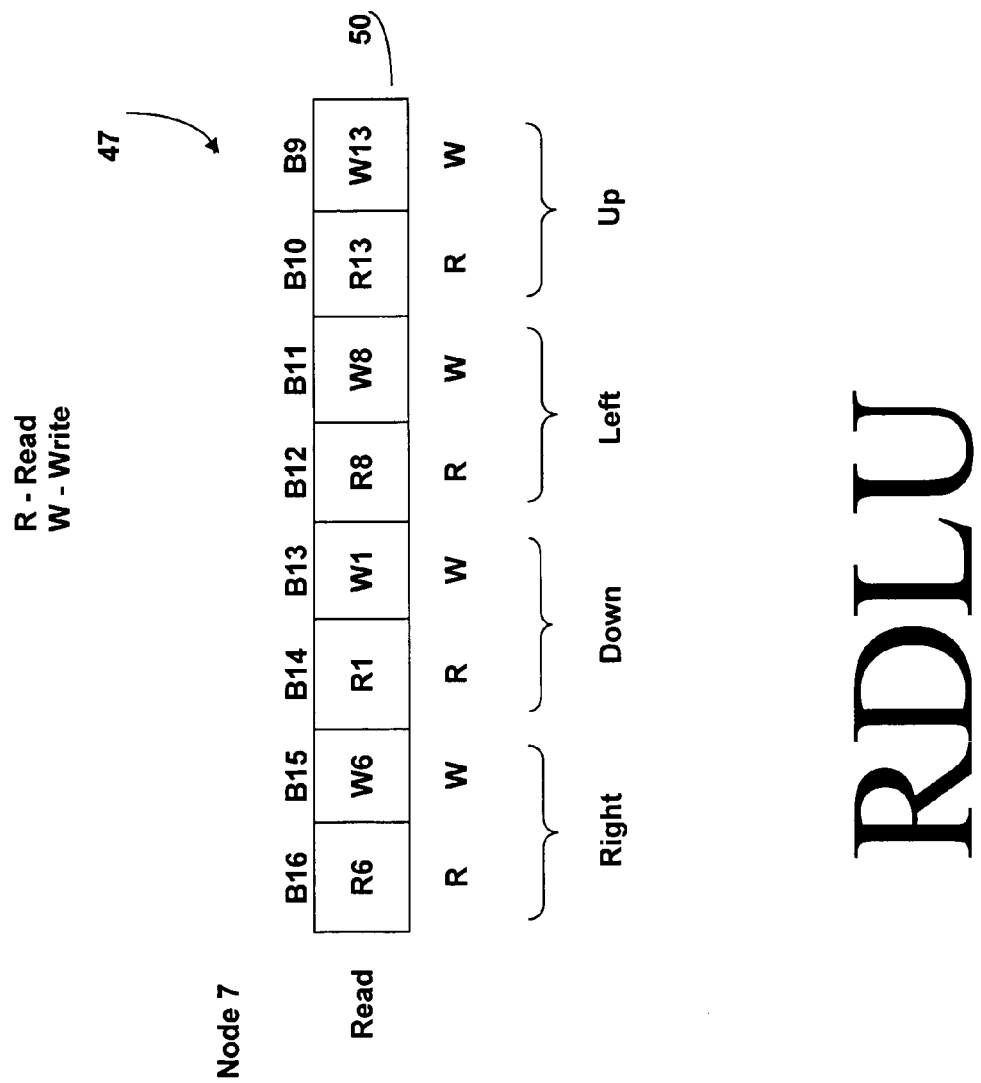

COMPUTER SYSTEM AND METHOD FOR EXECUTING PORT COMMUNICATIONS WITHOUT INTERRUPTING THE RECEIVING COMPUTER

This application claims priority to provisional application No. 60/849,498, entitled "SEAForth Applications Guide," filed Sep. 29, 2006, and also claims priority to provisional application No. 60/818,084, filed Jun. 30, 2006; and is a continuation-in-part of the application entitled, "Method and Apparatus for Monitoring Inputs to a Computer," Ser. No. 11/441,818, filed May 26, 2006; and claims priority to provisional application No. 60/797,345, filed May 3, 2006, and also claims priority to provisional application No. 60/788,265, filed Mar. 31, 2006; and is a continuation-in-part of the application entitled, "Asynchronous Power Saving Computer," Ser. No. 11/355,513, filed Feb. 16, 2006. All of the cited applications above are incorporated herein by reference in their entireties.

BACKGROUND OF THE INVENTION

1. Field of the Invention

The present invention relates to the field of computers and computer processors, and more particularly to a method and means for allowing a computer to execute instructions as they are received from an external source without first storing said instructions, and an associated method to facilitate communications between computers and the ability of a computer to use the available resources of another computer. The predominant current usage of the present inventive direct execution method and apparatus is in the combination of multiple computers on a single microchip, wherein operating efficiency is important not only because of the desire for increased operating speed but also because of the power savings and heat reduction that are a consequence of the greater efficiency.

2. Description of the Background Art

In the art of computing, processing speed is a much desired quality, and the quest to create faster computers and processors is ongoing. However, it is generally acknowledged in the industry that the limits for increasing the speed in microprocessors are rapidly being approached, at least using presently known technology. Therefore, there is an increasing interest in the use of multiple processors to increase overall computer speed by sharing computer tasks among the processors.

The use of multiple processors creates a need for communication between the processors. Therefore, there is a significant portion of time spent in transferring instructions and data between processors. Each additional instruction that must be executed in order to accomplish this places an incremental delay in the process which, cumulatively, can be very significant. The conventional method for communicating instructions or data from one computer to another involves first storing the data or instruction in the receiving computer and then, subsequently calling it for execution (in the case of an instruction) or for operation thereon (in the case of data).

In the prior art it is known that it is necessary to "get the attention" of a computer from time to time. Even though a computer may be busy with one task, another time-sensitive task requirement can occur that may necessitate temporarily diverting the computer away from the first task. Examples include, but are not limited to, providing input to a computer. In such cases, the computer might need to temporarily acknowledge the input and/or react in accordance with the input. Then, the computer will either continue what it was doing before the input or else change what it was doing based upon the input. Although an external input is used as an example here, the same situation occurs when there is a potential conflict for the attention of the arithmetic logic unit (ALU) between internal aspects of the computer, as well.

When receiving data and changes in status from input/output (I/O) ports, there have been two methods available in the prior art. One has been to "poll" the port, which involves reading the status of the port at fixed intervals to determine whether any data has been received or a change of status has occurred. However, polling the port consumes considerable time and resources. A better alternative has often been the use of "interrupts". When using interrupts, a processor can go about performing its assigned task and then, when an I/O port/device needs attention or the status changes, it sends an Interrupt Request (IRQ) to the processor. Once the processor receives an Interrupt Request, it will, for example, finish its current instruction, place a few things on the stack, and then execute the appropriate Interrupt Service Routine (ISR). Once the ISR has finished, the processor returns to where it left off. When using this method, the processor doesn't have to waste time, looking to see if the I/O device is in need of attention, but rather the device will only service the interrupt when it needs attention. However, the use of interrupts is far less than desirable in many cases, since there can be a great deal of overhead associated with the use of interrupts. For example, each time an interrupt occurs, a computer may have to temporarily store certain data relating to the task it was previously trying to accomplish, then load data pertaining to the interrupt, and then reload the data necessary for the prior task once the interrupt is handled.

An improvement to the above systems can be found using a system based on the Forth computer language. Forth systems have been able to have more than one "thread" of code executing at one time. This is often called a cooperative round-robin. The order in which the threads get a turn using the central processing unit (CPU) is fixed; for example, thread 4 always gets its turn after thread 3 and before thread 5. Each thread is allowed to keep the CPU as long as it wants to, and then relinquish it voluntarily. The thread does this by calling the word PAUSE. Only a few data items need to be saved during a PAUSE function in order for the original task to be restored, as opposed to large contexts that need to be saved during an interrupt function.

Each thread may or may not have work to do. If task 4 has work to do and the task before it in the round-robin (task 3) calls PAUSE, then task 4 will wake up and work until it decides to PAUSE again. If task 4 has no work to do, it passes control on to task 5. When a task calls a word which will perform an input/output function, and will therefore need to wait for the input/output to finish, a PAUSE is built into the input/output call.

The predictability of PAUSE allows for very efficient code. Frequently, a Forth based cooperative round-robin can give every existing thread a turn at the CPU in less time than it would take a pre-emptive multitasker to decide who should get the CPU next. However, a particular task may tend to overwhelm or overtake the CPU.

Another area of operating efficiency can be found by minimizing leakage current in a computer system. In the quest to make devices smaller, leakage current increases as insulation layers become thinner. In the near future, leakage power could reach as high as 50% of the active power. One attempt to curb leakage current can be found by utilizing sleep transistors. Sleep transistors act like a switch by isolating or disconnecting the power supply and blocks of logic when they are not needed. This can reduce leakage power by a factor of 2-1000 times, as disclosed in an article entitled *How* to Provide a Power-Efficient Architecture, by Bob Crepps, published in Embedded.com, Jul. 24, 2006.

However, there are several drawbacks in using sleep transistors. Many factors need to be considered in a system in order to incorporate efficient use of these transistors. The threshold voltage of a sleep transistor needs to be large; otherwise, the sleep transistor will have a high leakage current. This requires modification in the complementary metal-oxide semiconductor (CMOS) technology process to support both a high threshold voltage device for the sleep transistor and a low threshold voltage device for the logic gates. In addition, a large sleep transistor increases the area overhead and the dynamic power consumed for turning the transistor on and off.

To guarantee the proper functionality of a circuit, the sleep transistors have to be carefully sized to decrease their voltage drop while they are on. Two gates that switch at different times can share a sleep transistor. However, this is not practical for large circuits. Algorithms are necessary to determine the best implementation of sleep transistors for large circuits.

Other problems associated with sleep transistors include generating noise in the circuits, and a loss of data when used to disconnect flip flops from ground or supply voltage, as disclosed in an article entitled *Standby and Active Leakage Current Control and Minimization in CMOS VLSI Circuits*, by Farzan Fallah, et al., published in 2004. A method and/or apparatus is needed to reduce leakage current and provide a more efficient and less problematic computer processor system.

SUMMARY OF INVENTION

It would be useful to reduce the number of steps required to transmit, receive, and then use information in the form of data or instructions between computers. It would also be desirable to reduce or eliminate the time and resources consumed during an interrupt. In addition, it would be advantageous to expand the PAUSE function beyond one CPU. However, to the inventor's knowledge, no prior art system has streamlined the above described processes in a significant manner.

A computer processor array is disclosed in which power usage and heat dissipation are minimized, and computing efficiency is maximized. This is realized in part by a computer processor array, in which processors, also called nodes or cores become inactive but alert when not in an operating mode. The inactive node or core consumes essentially no power while inactive, and becomes active when an adjacent node or pin attempts to communicate with it. After execution of an incoming task, the node will go back to an inactive state until another task is sent to the node.

Array efficiency is also realized when a core is currently executing code or instructions, and a neighboring core communicates to the executing core. Rather then interrupting the executing core as in a conventional computing system, cores can be programmed to occasionally pause to check for incoming messages. If an incoming message awaits, then the executing core can act on the incoming message after pausing, and then continue with its original task.

These and other objects and advantages of the present invention will become clear to those skilled in the art in view of the description of modes of carrying out the invention, and the industrial applicability thereof, as described herein and as illustrated in the several figures of the drawings. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the described objects and/or advantages. Accordingly, the objects and/or advantages described herein are not essential elements of the present invention, and should not be construed as limitations.

BRIEF DESCRIPTION OF THE DRAWINGS

FIG. 3 is a block diagram depicting a general layout of one of the processors of FIGS. 1 and 2;

FIG. 4 is a diagrammatic representation of an instruction word according to the present inventive application;

FIG. 6 is a flow diagram depicting an example of the inventive method for executing instructions from a port;

FIG. 7 is a flow diagram depicting an example of the inventive improved method for alerting a processor;

FIG. 9a is a partial view of FIG. 9 with additional port detail;

FIG. 10 is a partial view of an I/O register;

DETAILED DESCRIPTION

Figure 1:
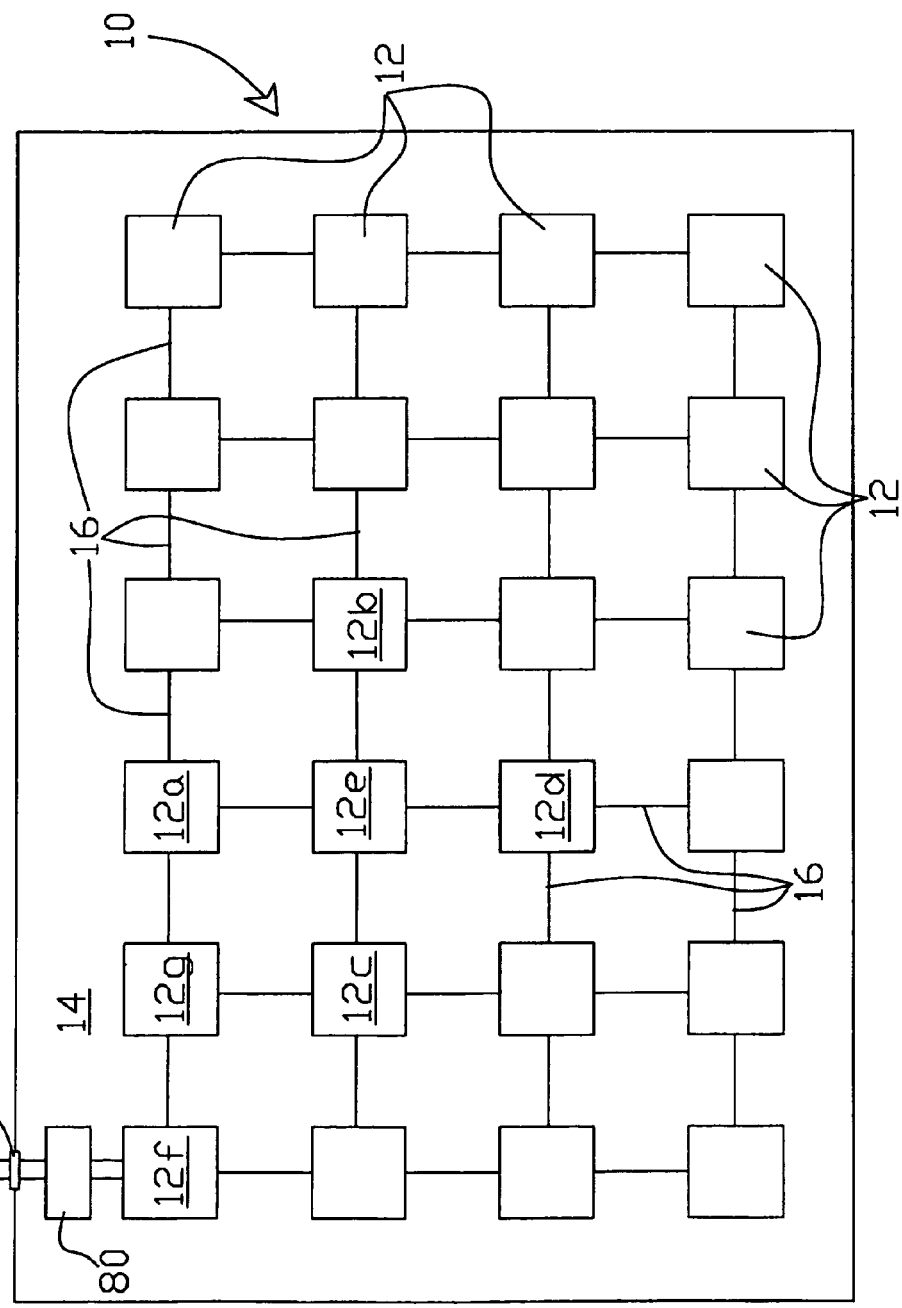
FIG. 1 is a diagrammatic view of a computer processor array, according to the present invention.

This invention is described with reference to the figures, in which like numbers represent the same or similar elements. While this invention is described in terms of modes for achieving this invention's objectives, it will be appreciated by those skilled in the art that variations may be accomplished in view of these teachings without deviating from the spirit or scope of the presently claimed invention.

The embodiments and variations of the invention described herein, and/or shown in the drawings, are presented by way of example only and are not limiting as to the scope of the invention. Unless otherwise specifically stated, individual aspects and components of the invention may be omitted or modified for a variety of applications while remaining within the spirit and scope of the claimed invention, since it is intended that the present invention is adaptable to many variations.

The following invention describes processors (also called computers, nodes, or cores) that operate in a mode referred to as "asleep but alert" or "inactive but alert" which both refer to a mode of operation in which the processor's functions have been temporarily suspended, halted, or ceased where essentially no power is being utilized. At the same time, the processor is alert or in a state of readiness to immediately begin processing functions when instructed to do so. When the inactive processor receives processing instructions, it is referred to as "being awakened" or "becoming activated."

A mode for carrying out the invention is given by an array of individual computer processors. The array is depicted in a diagrammatic view in FIG. 1 and is designated therein by the general reference character 10. The processor array 10 has a plurality (twenty four in the example shown) of computer processors 12 (sometimes also referred to as "cores" or "nodes" in the example of an array). In the example shown, all of the processors 12 are located on a single die 14. According to the present invention, each of the processors 12 is a generally independently functioning processor, as will be discussed in more detail hereinafter. The processors 12 are interconnected by a plurality (the quantities of which will be discussed in more detail hereinafter) of interconnecting data buses 16. In this example, the data buses 16 are bidirectional asynchronous high speed parallel data buses, although it is within the scope of the invention that other interconnecting means might be employed for the purpose. In the present embodiment of the array 10, not only is data communication between the processors 12 asynchronous, but the individual processors 12 also operate in an internally asynchronous mode. This has been found by the inventor to provide important advantages. For example, since a clock signal does not have to be distributed throughout the processor array 10, a great deal of power is saved. Furthermore, not having to distribute a clock signal eliminates many timing problems that could limit the size of the array 10 or cause other known difficulties. Also, the fact that the individual processors operate asynchronously saves a great deal of power, since each processor will use essentially no power when it is not executing instructions because there is no clock running therein.

One skilled in the art will recognize that there will be additional components on the die 14 that are omitted from the view of FIG. 1 for the sake of clarity. Such additional components include, but are not limited to power buses, external connection pads, and other such common aspects of a microprocessor chip.

Processor 12e is an example of one of the processors 12 that is not on the periphery of the array 10. That is, processor 12e has four orthogonally adjacent processors 12a, 12b, 12c and 12d, although it is within the scope of this invention that more than four adjacent processors could be utilized. This grouping of processors 12a through 12e will be used, by way of example, hereinafter in relation to a more detailed discussion of the communications between the processors 12 of the array 10. As can be seen in the view of FIG. 1, interior processors such as processor 12e will have at lease four other processors 12 with which they can directly communicate via the buses 16. In the following discussion, the principles discussed will apply to all of the processors 12 except that the processors 12 on the periphery of the array 10 will be in direct communication with only three or, in the case of the corner processors 12, only two other of the processors 12.

Figure 2:
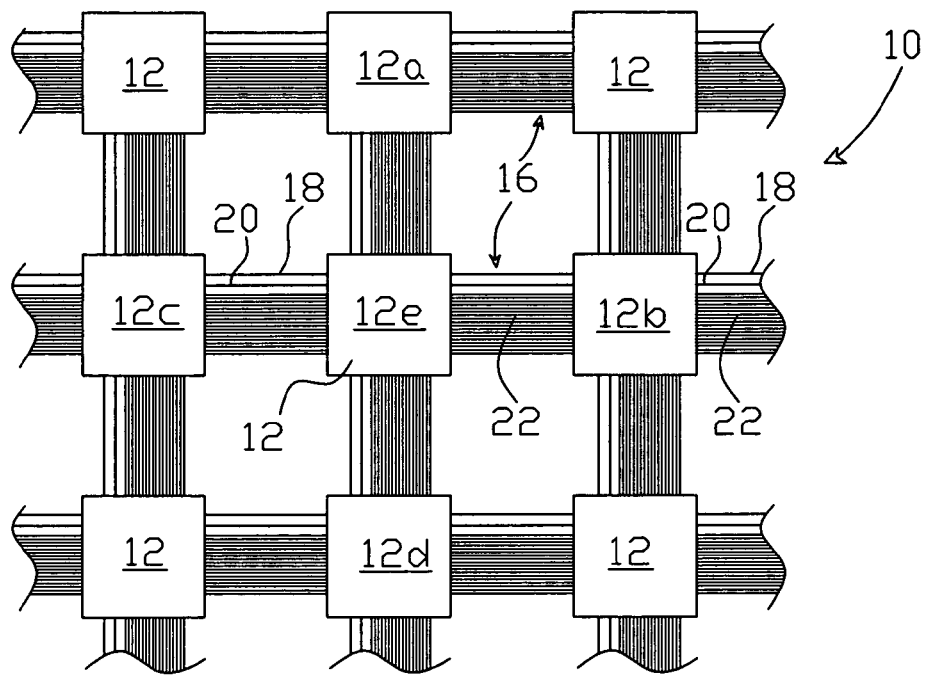
FIG. 2 is a detailed diagram showing a subset of the computer processors of FIG. 1 and a more detailed view of the interconnecting data buses of FIG. 1.

FIG. 2 is a more detailed view of a portion of FIG. 1 showing only some of the processors 12 and, in particular, processors 12a through 12e, inclusive. The view of FIG. 2 also reveals that the data buses 16 each have a read line 18, a write line 20 and a plurality (eighteen, in this example) of data lines 22. The data lines 22 are capable of transferring all the bits of one eighteen-bit instruction word simultaneously in parallel. It should be noted that, in one embodiment of the invention, some of the processors 12 are mirror images of adjacent processors. However, whether the processors 12 are all oriented identically or as mirror images of adjacent processors is not a limiting aspect of this presently described invention.

According to one aspect of the present inventive method, a processor 12, such as the processor 12e can set high one, two, three or all four of its read lines 18 such that it is prepared to receive data from the respective one, two, three or all four adjacent processors 12. Similarly, it is also possible for a processor 12 to set one, two, three or all four of its write lines 20 high.

When one of the adjacent processors 12a, 12b, 12c or 12d sets a write line 20 between itself and the processor 12e high, if the processor 12e has already set the corresponding read line 18 high, then a word is transferred from that processor 12a, 12b, 12c or 12d to the processor 12e on the associated data lines 22. Then, the sending processor 12 will release the write line 20 and the receiving processor (12e in this example) pulls both the write line 20 and the read line 18 low. The latter action will acknowledge to the sending processor 12 that the data has been received. Note that the above description is not intended necessarily to denote the sequence of events in order. In actual practice, the receiving processor may try to set the write line 20 low slightly before the sending processor 12 releases (stops pulling high) its write line 20. In such an instance, as soon as the sending processor 12 releases its write line 20, the write line 20 will be pulled low by the receiving computer 12e. It is important to note that when the write line 20 of the sending processor 12 goes high, the data or code is already transferred; therefore, the receiving processor (12e in this instance) merely needs to latch the data/code for an essentially instantaneous response.

If the processor 12e were attempting to write to the processor 12a, then processor 12e would set the write line 20 between processor 12e and processor 12a to high. If the read line 18 between processor 12e and processor 12a has then not already been set to high by processor 12a, then processor 12e will simply wait until processor 12a does set that read line 20 high. When both of a corresponding pair of write line 18 and read line 20 are set high, then the data awaiting to be transferred on the data lines 22 is transferred. Thereafter, the receiving processor 12 (processor 12a, in this example) sets both the read line 18 and the write line 20 between the two processors (12e and 12a in this example) to low as soon as the sending processor 12e releases the write line 18.

Whenever a processor 12 such as the processor 12e has set one of its write lines 20 high in anticipation of writing it will simply wait, using essentially no power, until the data is "requested", as described above, from the appropriate adjacent processor 12, unless the processor 12 to which the data is to be sent has already set its read line 18 high, in which case the data is transmitted immediately. Similarly, whenever a processor 12 has set one or more of its read lines 18 to high in anticipation of reading, it will simply wait, using essentially no power, until the write line 20 connected to a selected processor 12 goes high to transfer an instruction word between the two processors 12.

As discussed above, there may be several potential means and/or methods to cause the processors 12 to function as described. However, in this present example, the processors 12 so behave simply because they are operating generally asynchronously internally (in addition to transferring data there-between in the asynchronous manner described). That is, instructions are generally completed sequentially. When either a write or read instruction occurs, there can be no further action until that instruction is completed (or, perhaps alternatively, until it is aborted, as by a "reset" or the like). There is no regular clock pulse, in the prior art sense. Rather, a pulse is generated to accomplish a next instruction only when the instruction being executed either is not a read or write type instruction (given that a read or write type instruction would require completion, often by another entity) or else when the read or write type operation is, in fact, completed.

FIG. 3 is a block diagram depicting the general layout of an example of one of the processors 12 of FIGS. 1 and 2. As can be seen in the view of FIG. 3, each of the processors 12 is a generally self contained computer having its own random access memory (RAM) 24 and read only memory (ROM) 26. As mentioned previously, the processors 12 are also sometimes referred to as individual "nodes", given that they are, in the present example, combined on a single chip.

Other basic components of the processor 12 are a return stack 28 (including an R register 29, discussed hereinafter), an instruction area 30, an arithmetic logic unit ("ALU" or "processor") 32, a data stack 34, a decode logic section 36 for decoding instructions, and a slot sequencer 42. One skilled in the art will be generally familiar with the operation of stack based computers such as the processors 12 of this present example. The processors 12 are dual stack processors having the data stack 34 and the separate return stack 28. FIG. 3 also shows circular register arrays 28a and 34a for the return stack and data stack, respectively, along with the T register 44 and S register 46 of the data stack 34.

In this embodiment of the invention, the processor 12 has four communication ports 38 for communicating with adjacent processors 12. The communication ports 38 are tri-state drivers, having an off status, a receive status (for driving signals into the processor 12) and a send status (for driving signals out of the processor 12). If the particular processor 12 is not on the interior of the array (FIG. 1) such as the example of processor 12e, then one or more of the communication ports 38 will not be used in that particular processor, at least for the purposes described above. However, those communication ports 38 that do abut the edge of the die 14 can have additional circuitry, either designed into such processor 12 or else external to the processor 12 but associated therewith, to cause such communication port 38 to act as an external I/O port 39 (FIG. 1). Examples of such external I/O ports 39 include, but are not limited to, USB (universal serial bus) ports, RS232 serial bus ports, parallel communications ports, analog to digital and/or digital to analog conversion ports, and many other possible variations. No matter what type of additional or modified circuitry is employed for this purpose, according to the presently described embodiment of the invention, the method of operation of the "external" I/O ports 39 regarding the handling of instructions and/or data received there from will be alike to that described herein, in relation to the "internal" communication ports 38. In FIG. 1 an "edge" processor 12f is depicted with associated interface circuitry 80 (shown in block diagrammatic form) for communicating through an external I/O port 39 with an external device 82.

In the presently described embodiment, the instruction area 30 includes a number of registers 40 including, in this example, an A register 40a, a B register 40b and a P register 40c. In this example, the A register 40a is a full eighteen-bit register, while the B register 40b and the P register 40c are nine-bit registers. An I/O register 47 (18 bit) is located between the memory (ROM 26 and RAM 24) and the communication ports 38. The I/O register 47 will be disclosed in greater detail hereinafter.

Although the invention is not limited by this example, the present processor 12 is implemented to execute native Forth language instructions. As one familiar with the Forth computer language will appreciate, complicated Forth instructions, known as Forth "words" are constructed from the native processor instructions designed into the processor. The collection of Forth words is known as a "dictionary". As will be described in greater detail hereinafter, the processor 12 reads eighteen bits at a time from RAM 24, ROM 26 or directly from one of the data buses 16 (FIG. 2). However, since in Forth most instructions (known as operand-less instructions) obtain their operands directly from the stacks 28 and 34, they are generally only five bits in length, such that up to four instructions can be included in a single eighteen-bit instruction word, with the condition that the last instruction in the group is selected from a limited set of instructions that require only three bits.

FIG. 4 is a diagrammatic representation of an instruction word 48. (It should be noted that the instruction word 48 can actually contain instructions, data, or some combination thereof.) The instruction word 48 consists of eighteen bits 50. This being a binary computer, each of the bits 50 will be a '1' or '0'. As previously discussed herein, the eighteen-bit wide instruction word 48 can contain up to four instructions 52 in four slots 54 called slot zero 54a, slot one 54b, slot two 54c and slot three 54d. In the present embodiment of the invention, the eighteen-bit instruction words 48 are always read as a whole. Therefore, since there is always a potential of having up to four instructions in the instruction word 48, a NOP (no operation) instruction is included in the instruction set of the processor 12 to provide for instances when using all of the available slots 54 might be unnecessary or even undesirable.

In addition to the registers previously discussed herein, the instruction area 30 also has an 18 bit instruction register 30a for storing the instruction word 48 that is presently being used, and an additional 5 bit opcode register 30b for the instruction in the particular instruction word presently being executed.

As discussed above, the i4 bit 66 of each instruction 52 is set according to whether or not that instruction is either of a read or a write type of instruction, as opposed to that instruction being one that requires no input or output. The remaining bits 50 in the instruction 52 provide the remainder of the particular opcode for that instruction. In the case of a read or write type instruction, one or more of the bits may be used to indicate where data is to be read from, or written to, in that particular processor 12. In the present example of the invention, data to be written always comes from the T register 44 (the top of the data stack 34); however data can be selectively read into either the T register 44 or else the instruction area 30 from where it can be executed. In this particular embodiment of the invention, either data or instructions can be communicated in the manner described herein and instructions can therefore, be executed directly from the data bus 16.

One or more of the bits 50 will be used to indicate which of the ports 38, if any, is to be set to read or write. This later operation is optionally accomplished by using one or more bits to designate a register 40, such as the A register 40a, the B register 40b, or the like. In such an example, the designated register 40 will be preloaded with data having a bit corresponding to each of the ports 38 (and, also, any other potential entity with which the processor 12 may be attempting to communicate, such as memory (RAM 24 or ROM 26), an external communications port 39, or the like.) For example, each of four bits in the particular register 40 can correspond to each of the up port 38a, the right port 38b, the left port 38c or the down port 38d. In such case, where there is a '1' at any of those bit locations, communication will be set to proceed through the corresponding port 38. In the present embodiment of the invention, it is anticipated that a read opcode might set more than one port 38 for communication in a single instruction.

The immediately following example will assume a communication wherein processor 12e is attempting to write to processor 12c, although the example is applicable to communication between any adjacent processors 12. When a write instruction is executed in a writing processor 12e, the selected write line 20 (in this example, the write line 20 between processors 12e and 12c) is set high; if the corresponding read line 18 is already high then data is immediately sent from the selected location through the selected communications port 38. Alternatively, if the corresponding read line 18 is not already high, then processor 12e will simply stop operation until the corresponding read line 18 does go high.

As for how the operation of the processor 12e is resumed when a read or write type instruction is completed, the mechanism for that is as follows. When both the read line 18 and the corresponding write line 20 between processors 12e and 12c are high, then both lines 18 and 20 will be released by each of the respective processors 12 that is holding it high. (In this example, the sending processor 12e will be holding the write line 18 high while the receiving processor 12c will be holding the read line 20 high). Then the receiving processor 12c will pull both lines 18 and 20 low. In actual practice, the receiving processor 12c may attempt to pull the lines 18 and 20 low before the sending processor 12e has released the write line 18. However, since the lines 18 and 20 are pulled high and only weakly held (latched) low, any attempt to pull a line 18 or 20 low will not actually succeed until that line 18 or 20 is released by the processor 12 that is holding it high.

When both lines 18 and 20 in a data bus 16 are pulled low, this is an "acknowledge" condition. Each of the processors 12e and 12c will, upon the acknowledge condition, set its own internal acknowledge line high.

As can be appreciated in light of the above discussion, the operations are essentially the same whether processor 12e attempts to write to processor 12c first, or whether processor 12c first attempts to read from processor 12e. The operation cannot be completed until both processors 12e and 12c are ready and, whichever processor 12e or 12c is ready first, that first processor 12 simply "becomes inactive" until the other processor 12e or 12c completes the transfer. Another way of looking at the above described process is that, actually, both the writing processor 12e and the receiving processor 12c become inactive when they execute the write and read instructions, respectively, but the last one to enter into the transaction reactivates nearly instantaneously when both the read line 18 and the write line 20 are high, whereas the first processor 12 to initiate the transaction can stay inactive nearly indefinitely until the second processor 12 is ready to complete the process.

The inventor believes that a key feature for enabling efficient asynchronous communications between devices is a type of acknowledge signal or condition. In the prior art, most communication between devices has been clocked and there is no direct way for a sending device to know that the receiving device has properly received the data. Methods such as checksum operations may have been used to attempt to insure that data is correctly received, but the sending device has no direct indication that the operation is completed. The present inventive method, as described herein, provides the necessary acknowledge condition that allows, or at least makes practical, asynchronous communications between the devices. Furthermore, the acknowledge condition also makes it possible for one or more of the devices to "become inactive" until the acknowledge condition occurs. An acknowledge condition could be communicated between the processors 12 by a separate signal being sent between the processors 12 (either over the interconnecting data bus 16 or over a separate signal line), and such an acknowledge signal would be within the scope of this aspect of the present invention. However, according to the embodiment of the invention described herein, it can be appreciated that there is even more economy involved here, in that the method for acknowledgement does not require any additional signal, clock cycle, timing pulse, or any such resource beyond that described, to actually affect the communication.

Figure 5:
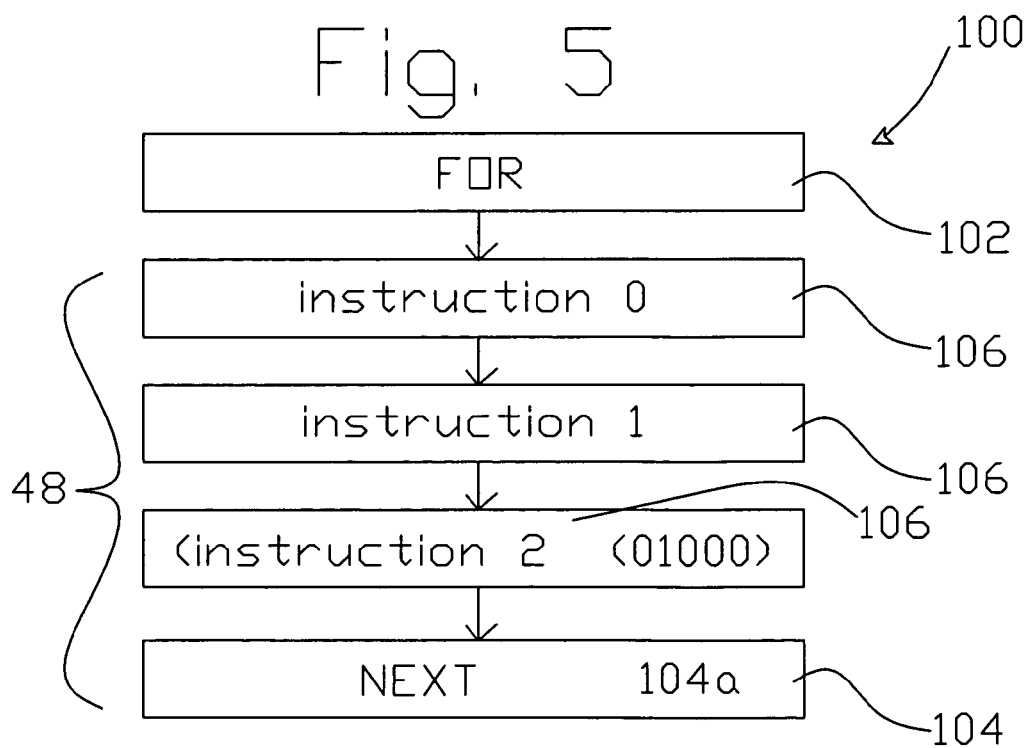
FIG. 5 is a flow diagram depicting an example of a micro-loop according to the present invention.

Since four instructions 52 can be included in an instruction word 48 and since, according to the present invention, an entire instruction word 48 can be communicated at one time between processors 12, this presents an ideal opportunity for transmitting a very small program in one operation. For example most of a small "For/Next" loop can be implemented in a single instruction word 48. FIG. 5 is a diagrammatic representation of a micro-loop 100. The micro-loop 100, not unlike other prior art loops, has a FOR instruction 102 and a NEXT instruction 104. Since an instruction word 48 (FIG. 4) contains as many as four instructions 52, an instruction word 48 can include three operation instructions 106 within a single instruction word 48. The operation instructions 106 can be essentially any of the available instructions that a programmer might want to include in the micro-loop 100. A typical example of a micro-loop 100 that might be transmitted from one processor 12 to another might be a set of instructions for reading from, or writing to the RAM 24 of the second processor 12, such that the first processor 12 could "borrow" available RAM 24 capacity.

The FOR instruction 102 pushes a value onto the return stack 28 representing the number of iterations desired. That is, the value on the T register 44 at the top of the data stack 34 is pushed onto the R register 29 of the return stack 28. The FOR instruction 102 can be located in any slot 54. Where the FOR instruction 102 is not located in slot three 54d, then the remaining instructions 52 in that instruction word 48 will be executed before going on to the micro-loop 100, which will generally be the next loaded instruction word 48.

According to the presently described embodiment of the invention, the NEXT instruction 104 depicted in the view of FIG. 5 is a particular type of NEXT instruction 104. This is because it is located in slot three 54d (FIG. 4) According to this embodiment of the invention, it is assumed that all of the data in a particular instruction word 48 that follows an "ordinary" NEXT instruction (not shown) is an address (the address where the for/next loop begins). The opcode for the NEXT instruction 104 is the same, no matter which of the four slots 54 it is in (with the obvious exception that the last two digits are assumed if it is in slot three 54d, rather than being explicitly written, as discussed previously herein). However, since there can be no address data following the NEXT instruction 104 when it is in slot three 54d, it can be also assumed that the NEXT instruction 104 in slot three 54d is a MICRO-NEXT instruction 104a. The MICRO-NEXT instruction 104a uses the address of the first instruction 52, located in slot zero 54a of the same instruction word 48 in which it is located, as the address to which to return. The MICRO-NEXT instruction 104a also takes the value from the R register 29 (which was originally pushed there by the FOR instruction 102), decrements it by 1, and then returns it to the R register 29. When the value on the R register 29 reaches a predetermined value (such as zero), then the MICRO-NEXT instruction will load the next instruction word 48 and continue on as described previously herein. However, when the MICRO-NEXT instruction 104a reads a value from the R register 29 that is greater than the predetermined value, it will resume operation at slot zero 54a of its own instruction word 48 and execute the three instructions 52 located in slots zero through three, inclusive, thereof. That is, a MICRO-NEXT instruction 104a will always, in this embodiment of the invention, execute three operation instructions 106. Because, in some instances, it may not be desired to use all three potentially available instructions 52, a "NOP" instruction is available to fill one or two of the slots 54, as required.

It should be noted that micro-loops 100 can be used entirely within a single processor 12. Indeed, the entire set of available machine language instructions is available for use as the operation instructions 106, and the application and use of micro-loops is limited only by the imagination of the programmer. However, when the ability to execute an entire micro-loop 100 within a single instruction word 48 is combined with the ability to allow a processor 12 to send the instruction word 48 to a neighbor processor 12 to execute the instructions 52 therein essentially directly from the data bus 16, this provides a powerful tool for allowing a processor 12 to utilize the resources of its neighbors.

The small micro-loop 100, all contained within the single instruction word 48, can be communicated between processors 12, as described herein and it can be executed directly from the communications port 38 of the receiving processor 12, just like any other set of instructions contained in an instruction word 48, as described herein. While there are many uses for this sort of "micro-loop" 100, a typical use would be where one processor 12 wants to store some data onto the memory of a neighbor processor 12. It could, for example, first send an instruction to that neighbor processor telling it to store an incoming data word to a particular memory address, then increment that address, then repeat for a given number of iterations (the number of data words to be transmitted). To read the data back, the first processor would just instruct the second processor (the one used for storage here) to write the stored data back to the first processor, using a similar micro-loop.

By using the micro-loop 100 structure in conjunction with the direct execution aspect described herein, a processor 12 can use an otherwise resting neighbor processor 12 for storage of excess data when the data storage need exceeds the relatively small capacity built into each individual processor 12. While this example has been described in terms of data storage, the same technique can equally be used to allow a processor 12 to have its neighbor share its computational resources—by creating a micro-loop 100 that causes the other processor 12 to perform some operations, store the result, and repeat a given number of times. As can be appreciated, the number of ways in which this inventive micro-loop 100 structure can be used is nearly infinite.

As previously mentioned herein, in the presently described embodiment of the invention, either data or instructions can be communicated in the manner described herein and instructions can, therefore, be executed essentially directly from the data bus 16. That is, there is no need to store instructions to RAM 24 and then recall them before execution. Instead, according to this aspect of the invention, an instruction word 48 that is received on a communications port 38 is not treated essentially differently than it would be were it recalled from RAM 24 or ROM 26.

One of the available machine language instructions is a FETCH instruction. The FETCH instruction uses the address on the A register 40a to determine from where to fetch an 18 bit word. Of course, the program will have to have already provided for placing the correct address on the A register 40a. As previously discussed herein, the A register 40a is an 18 bit register, such that there is a sufficient range of address data available that any of the potential sources from which a fetch can occur can be differentiated. That is, there is a range of addresses assigned to ROM, a different range of addresses assigned to RAM, and there are specific addresses for each of the ports 38 and for the external I/O port 39. A FETCH instruction always places the 18 bits that it fetches on the T register 44. An important advantage exists here in that there are no instruction fetches inside the loop. Therefore, there is approximately a 30% increase in efficiency, with a corresponding decrease in power consumption.

In contrast, as previously discussed herein, executable instructions (as opposed to data) are temporarily stored in the instruction register 30a. There is no specific command for "fetching" an 18 bit instruction word 48 into the instruction register 30a. Instead, when there are no more executable instructions left in the instruction register 30a, then the processor will automatically fetch the "next" instruction word 48. Where that "next" instruction word is located is determined by the "program counter" or "pc", herein called the P register 40c. The P register 40c is often automatically incremented, as is the case where a sequence of instruction words 48 is to be fetched from RAM 24 or ROM 26. However, there are a number of exceptions to this general rule. For example, a JUMP or CALL instruction will cause the P register 40c to be loaded with the address designated by the data in the remainder of the presently loaded instruction word 48 after the JUMP or CALL instruction, rather than being incremented. When the P register 40c is then loaded with an address corresponding to one or more of the ports 38, then the next instruction word 48 will be loaded into the instruction register 30a from the ports 38. The P register 40c also does not increment when an instruction word 48 has just been retrieved from a port 38 into the instruction register 30a. Rather, it will continue to retain that same port address until a specific JUMP or CALL instruction is executed to change the P register 40c. That is, once the processor 12 is told to look for its next instruction from a port 38, it will continue to look for instructions from that same port 38 (or ports 38) until it is told to look elsewhere, such as back to the memory (RAM 24 or ROM 26) for its next instruction word 48.

As noted above, the processor 12 knows that the next eighteen bits fetched is to be placed in the instruction register 30a when there are no more executable instructions left in the present instruction word 48. By default, there are no more executable instructions left in the present instruction word 48 after a JUMP or CALL instruction (or also after certain other instructions that will not be specifically discussed here) because, by definition, the remainder of the 18 bit instruction word following a JUMP or CALL instruction is dedicated to the address referred to by the JUMP or CALL instruction. Another way of stating this is that the above described processes are unique in many ways, including but not limited to the fact that a JUMP or CALL instruction can, optionally, be to a port 38, rather than to just a memory address, or the like.

It should be remembered that, as discussed previously herein, the processor 12 can look for its next instruction from one port 38 or from any of a group of the ports 38. Therefore, addresses are provided to correspond to various combinations of the ports 38. When, for example, a processor is told to FETCH an instruction from a group of ports 38, then it will accept the first available instruction word 48 from any of the selected ports 38. If no neighbor processor 12 has already attempted to write to any of those ports 38, then the processor 12 in question will "become inactive", as described in detail above, until a neighbor does write to the selected port 38.

FIG. 6 is a flow diagram depicting an example of the above described direct execution method 120. A "normal" flow of operations will commence when, as discussed previously herein, there are no more executable instructions left in the instruction register 30a. At such time, the processor 12 will "fetch" another instruction word (note that the term "fetch" is used here in a general sense, in that an actual FETCH instruction is not used), as indicated by a "fetch word" operation 122. That operation will be accomplished according to the address in the P register 40c (as indicated by an "address" decision operation 124 in the flow diagram of FIG. 6). If the address in the P register 40c is a RAM 24 or ROM 26 address, then the next instruction word 48 will be retrieved from the designated memory location in a "fetch from memory" operation 126. If, on the other hand, the address in the P register 40c is that of a port 38 or ports 38 (not a memory address), then the next instruction word 48 will be retrieved from the designated port location in a "fetch from port" operation 128. In either case, the instruction word 48 being retrieved is placed in the instruction register 30a in a "retrieve instruction word" operation 130. In an "execute instruction word" operation 132, the instructions in the slots 54 of the instruction word 48 are accomplished sequentially, as described previously herein.

In a "jump" decision operation 134, it is determined if one of the operations in the instruction word 48 is a JUMP instruction, or other instruction that would divert operation away from the continued "normal" progression as discussed previously herein. If yes, then the address provided in the instruction word 48 after the JUMP (or other such) instruction is provided to the P register 40c in a "load P register" operation 136, and the sequence begins again in the "fetch word" operation 122, as indicated in the diagram of FIG. 6. If no, then the next action depends upon whether the last instruction FETCH was from a port 38 or from a memory address, as indicated in a "port address" decision operation 138. If the last instruction FETCH was from a port 38, then no change is made to the P register 30a and the sequence is repeated starting with the "fetch word" operation 122. If, on the other hand, the last instruction FETCH was from a memory address (RAM 24 or ROM 26), then the address in the P register 30a is incremented, as indicated by an "increment P register" operation 140 in FIG. 6, before the "fetch word" operation 122 is accomplished.

The above description is not intended to represent actual operational steps. Instead, it is a diagram of the various decisions and operations resulting there from that are performed according to the described embodiment of the invention. Indeed, this flow diagram should not be understood to mean that each operation described and shown requires a separate distinct sequential step. In fact many of the described operations in the flow diagram of FIG. 6 will, in practice, be accomplished generally simultaneously.

FIG. 7 is a flow diagram depicting an example of a method for alerting a processor 150. As previously discussed herein, the processors 12 of the embodiment described will "become inactive" while awaiting an input. Such an input can be from a neighboring processor 12, as in the embodiment described in relation to FIGS. 1 through 4. Alternatively, as was also discussed previously herein, the processors 12 that have communication ports 38 that abut the edge of the die 14 can have additional circuitry, either designed into such processor 12 or else external to the processor 12 but associated therewith, to cause such communication port 38 to act as an external I/O port 39. In either case, the inventive combination can provide the additional advantage that the "inactive" processor 12 can be poised and ready to activate and spring into some prescribed action when an input is received. This process is referred to as a worker mode.

Each processor 12 is programmed to JUMP to an address when it is started. That address will be the address of the first instruction word 48 that will start that particular processor 12 on its designated job. The instruction word can be located, for example, in the ROM 26. After a cold start, a processor 12 may load a program, such as a program known as a worker mode loop. The worker mode loop for center processors 12, edge processors 12, and corner processors 12 will be different. In addition, some processors 12 may have specific tasks at boot-up in ROM associated with their positions within the array 10. Worker mode loops will be described in greater detail hereinafter.

While there are numerous ways in which this feature might be used, an example that will serve to illustrate just one such "computer alert method" is illustrated in the view of FIG. 7 and is enumerated therein by the reference character 150. As can be seen in the view of FIG. 7 in an "inactive but alert state" operation 152, a processor 12 is caused to "become inactive" such that it is awaiting input from a neighbor processor 12, or more than one (as many as all four) neighbor processors or, in the case of an "edge" processor 12 an external input, or some combination of external inputs and/or inputs from a neighbor processor 12. As described previously herein, a processor 12, can "become inactive" awaiting completion of either a read or a write operation. Where the processor 12 is being used, as described in this example, to await some possible "input", then it would be natural to assume that the waiting processor has set its read line 18 high awaiting a "write" from the neighbor or outside source. Indeed, it is presently anticipated that will be the usual condition. However, it is within the scope of the invention that the waiting processor 12 will have set its write line 20 high and, therefore, that it will become activated when the neighbor or outside source "reads" from it.

In an "activate" operation 154, the inactive processor 12 is caused to resume operation because the neighboring processor 12 or external device 39 has completed the transaction being awaited. If the transaction being awaited was the receipt of an instruction word 48 to be executed, then the processor 12 will proceed to execute the instructions therein. If the transaction being awaited was the receipt of data, then the processor 12 will proceed to execute the next instruction in queue, which will be either the instruction in the next slot 54 in the present instruction word 48, or else the next instruction word 48 will be loaded and the next instruction will be in slot 0 of that next instruction word 48. In any case, while being used in the described manner, then that next instruction will begin a sequence of one or more instructions for handling the input just received. Options for handling such input can include reacting to perform some predefined function internally, communicating with one or more of the other processors 12 in the array 10, or even ignoring the input (just as conventional prior art interrupts may be ignored under prescribed conditions). The options are depicted in the view of FIG. 7 as an "act on input" operation 156. It should be noted that, in some instances, the content of the input may not be important. In some cases, for example, it may be only the very fact that an external device has attempted communication that is of interest.

One skilled in the art will recognize that this above described operating mode will be useful as a more efficient alternative to the conventional use of interrupts. When a processor 12 has one or more of its read lines 18 (or a write line 20) set high, it can be said to be in an "alert" condition. In the alert condition, the processor 12 is ready to immediately execute any instruction sent to it on the data bus 16 corresponding to the read line or lines 18 that are set high or, alternatively, to act on data that is transferred over the data bus 16. Where there is an array of processors 12 available, one or more can be used, at any given time, to be in the above described alert condition such that any of a prescribed set of inputs will trigger it into action. This is preferable to using the conventional interrupt technique to "get the attention" of a processor, because an interrupt will cause a processor to have to store certain data, load certain data, and so on, in response to the interrupt request. According to the present invention, a processor can be placed in the alert condition and dedicated to awaiting the input of interest, such that not a single instruction period is wasted in beginning execution of the instructions triggered by such input. Again, note that in the presently described embodiment, processors in the alert condition will actually be "inactive", meaning that they are using essentially no power, but "alert" in that they will be instantly triggered into action by an input. However, it is within the scope of this aspect of the invention that the "alert" condition could be embodied in a processor even if it were not "inactive". The described alert condition can be used in essentially any situation where a conventional prior art interrupt (either a hardware interrupt or a software interrupt) might have otherwise been used.

Figure 8:
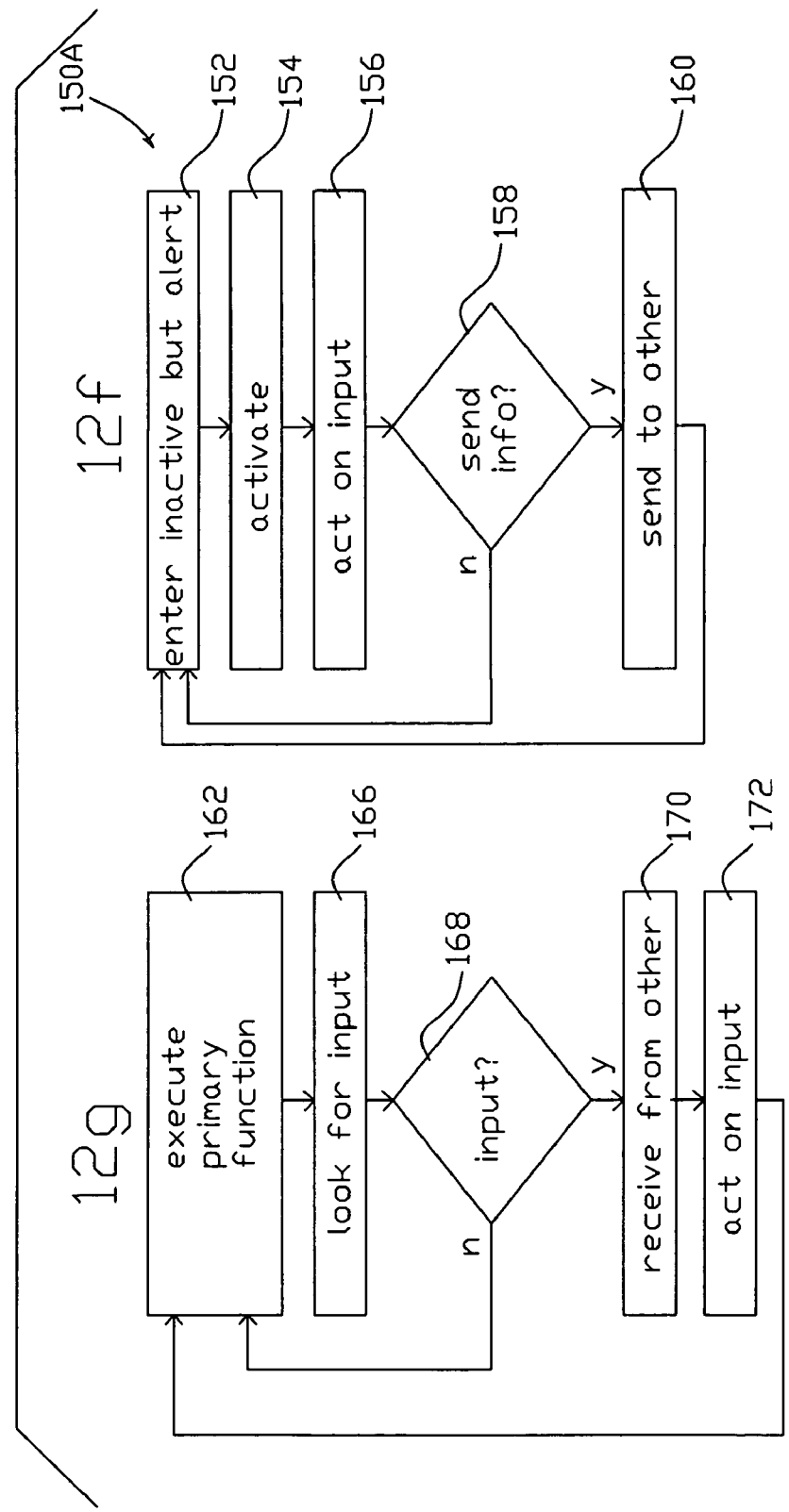
FIG. 8 is a flow diagram depicting a method for awakening a processor and sending input to an executing processor.

FIG. 8 is another example of a processor alert method 150a. This is but one example wherein interaction between a monitoring processor 12f (FIG. 1) and another processor 12g (FIG. 1) that is assigned to some other task may be desirable or necessary. As can be seen in the view of FIG. 8, there are two generally independent flow charts, one for each of the processors 12f and 12g. This is indicative of the nature of the cooperative coprocessor approach of the present invention, wherein each of the processors 12 has its own assignment which it carries out generally independently, except for those occasions when interaction is accomplished as described herein. This invention provides an alternative to the use of interrupts to handle inputs, whether such inputs come from an external input device, or from another processor 12 in the array 10. Instead of causing a processor 12 to have to stop what it is doing in order to handle an interrupt, the inventive combination described herein will allow for a processor 12 to be in an "inactive but alert" state, as previously described. Therefore, one or more processors 12 can be assigned to receive and act upon certain inputs.

Regarding the processor 12f and the "enter inactive but alert status" operation 152, the "activate" operation 154, and the "act on input" operation 156 each are accomplished as described previously herein in relation to the first example of the processor alert method 150. However, because this example anticipates a possible need for interaction between the processors 12f and 12g, then following the "act on input" operation 156, the processor 12f enters a "send info?" decision operation 158 wherein, according to its programming, it is determined if the input just received requires the attention of the other processor 12g. If no, then the processor 12f returns to inactive but alert status, or some other alternative such as was discussed previously herein. If yes, then the processor 12f initiates communication with the processor 12g as described in detail previously herein in a "send to other" operation 160. It should be noted that, according to the choice of the programmer, the processor 12f could be sending instructions such as it may have generated internally in response to the input from the external device 82. Alternatively, the processor 12f could pass on data to the processor 12g and such data could be internally generated in processor 12 or else "passed through" from the external device 82. Still another alternative might be that the processor 12f, in some situations, might attempt to read from the processor 12g when it receives an input from the external device 82. All of these opportunities are available to the programmer.

The processor 12g is generally executing code to accomplish its assigned primary task, whatever that might be, as indicated in an "execute primary function" operation 162. However, if the programmer has decided that occasional interaction between the processors 12f and 12g is desirable, then the programmer will have provided that the processor 12g occasionally pause to see if one or more of its neighbors has attempted a communication, as indicated in a "look for input" operation 166. An "input?" decision operation 168 is made in the event that there is a communication waiting (as, for example, if the processor 12f has already initiated a write to the processor 12g). If there has been a communication initiated (yes), then the processor 12g will complete the communication, as described in detail previously herein, in a "receive from other" operation 170. If no, then the processor 12g will return to the execution of its assigned function, as shown in FIG. 8. After the "receive from other" operation 170, the processor 12g will act on the input received in an "act on input" operation 172. As mentioned above, the programmer could have provided that the processor 12g would be expecting instructions such as input, in which case the processor 12g would execute the instructions as described previously herein. Alternatively, the processor 12g might be programmed to be expecting data to act upon.

In the example of FIG. 8, it is shown that following the "act on input" operation 172, the processor 12g returns to the accomplishment of its primary function (that is, it returns to the "execute primary function" operation 162). However the possibility of even more complicated examples certainly exists. For instance, the programming might be such that certain inputs received from the processor 12f will cause it to abort its previously assigned primary function and begin a new one, or else it might simply temporarily stop and await further input. As one skilled in the art will recognize, the various possibilities for action here are limited only by the imagination of the programmer.

It should be noted that, according to the embodiment of the invention described herein, a given processor 12 need not be interrupted while it is performing a task because another processor 12 is assigned the task of monitoring and handling inputs that might otherwise require an interrupt. However, it is interesting to note also that the processor 12 that is busy handling another task also cannot be disturbed unless and until its programming provides that it look to its ports 38 for input. Therefore, it will sometimes be desirable to cause the processor 12 to pause or suspend its current task to look for other inputs. The concept of "Pause" and how it is used will be discussed in greater detail later.

Each port 38 between processors 12 comprises data lines 22 and one read line 18 and one write line 20, which inclusively make up the data bus 16. In addition to the data bus 16, each port 38 also comprises handshake control signals. The data lines 22 connect between the ports 38 of two adjacent processors 12. For example, a word or op code may reside in the T register 44 of processor 12e during a STORE (write) instruction; the write line 20 of processor 12e would then be set high. When the read line 18 of processor 12c is set high, then data is transferred into the T register 44 of processor 12c in a FETCH (read) instruction. After the transaction is complete, both the read line 18 and the write line 20 are set low. In this example, this data becomes an instruction when it is read by the P register 40c.

When a processor 12 reads a message, the message could be in the form of data, instructions, or signals. Instructions may be stored into memory and used later by the same processor 12, or stored into and executed directly from a port 38 by a different processor 12. If a processor 12 is reading from memory using its P register 40c, it will either immediately execute the instruction by putting the instruction into the instruction register 30a, or it will read the message as data and put it into the T register 44. A FETCH instruction will read a message as data when the FETCH instruction is directed or addressed to a port 38. If a JUMP or CALL instruction is to a port 38, or a RETURN instruction is to a port 38 address, then the P register 40c will read what is written to the port 38 as instructions and the instruction will be treated as executable code.

A receiving processor 12 could read a message as data and then write a message as data. A message that is routed (i.e. sent from one processor 12 to a non-adjacent processor 12 through intermediary processors 12) is interpreted as data and read into the T register 44 of each successive processor 12 until the intended recipient is reached, then the message is interpreted as code (read from the P register 40c) and then executed. Therefore, if a message is read during FETCH A (defined as reading the contents of memory specified by the A register 40a) or FETCH A+ (defined as reading the contents of memory specified by the A register 40a, and adding one to the A register 40a) or FETCH P+ (defined as reading the contents specified by the P register 40c, and adding one to the P register 40c), then the message is transferred into the T register 44 of the processor 12 doing the reading. If the processor 12 is reading the message from the P register 40c, then the message is transferred into the instruction register 30a of the receiving processor 12.

FIG. 1 showed an array 10 of interconnected processors 12 located on a single die 14; a total of 24 processors 12 were given as an example, wherein each processor 12 has several pins located about its periphery. Each processor 12 has four ports 38 that are designated as right, down, left, and up (RDLU). In FIG. 1, processor 12e has four adjacent processors 12, wherein processor 12b is the right neighbor, processor 12d is the down neighbor, processor 12c is the left neighbor, and processor 12a is the up neighbor, all with respect to the center processor 12e. Even though the edge processors 12 have only three adjacent neighbors and the corner processors 12 have only two adjacent neighbors, these edge and corner processors 12 still have four ports 38 which are also designated as RDLU.

Figure 9:
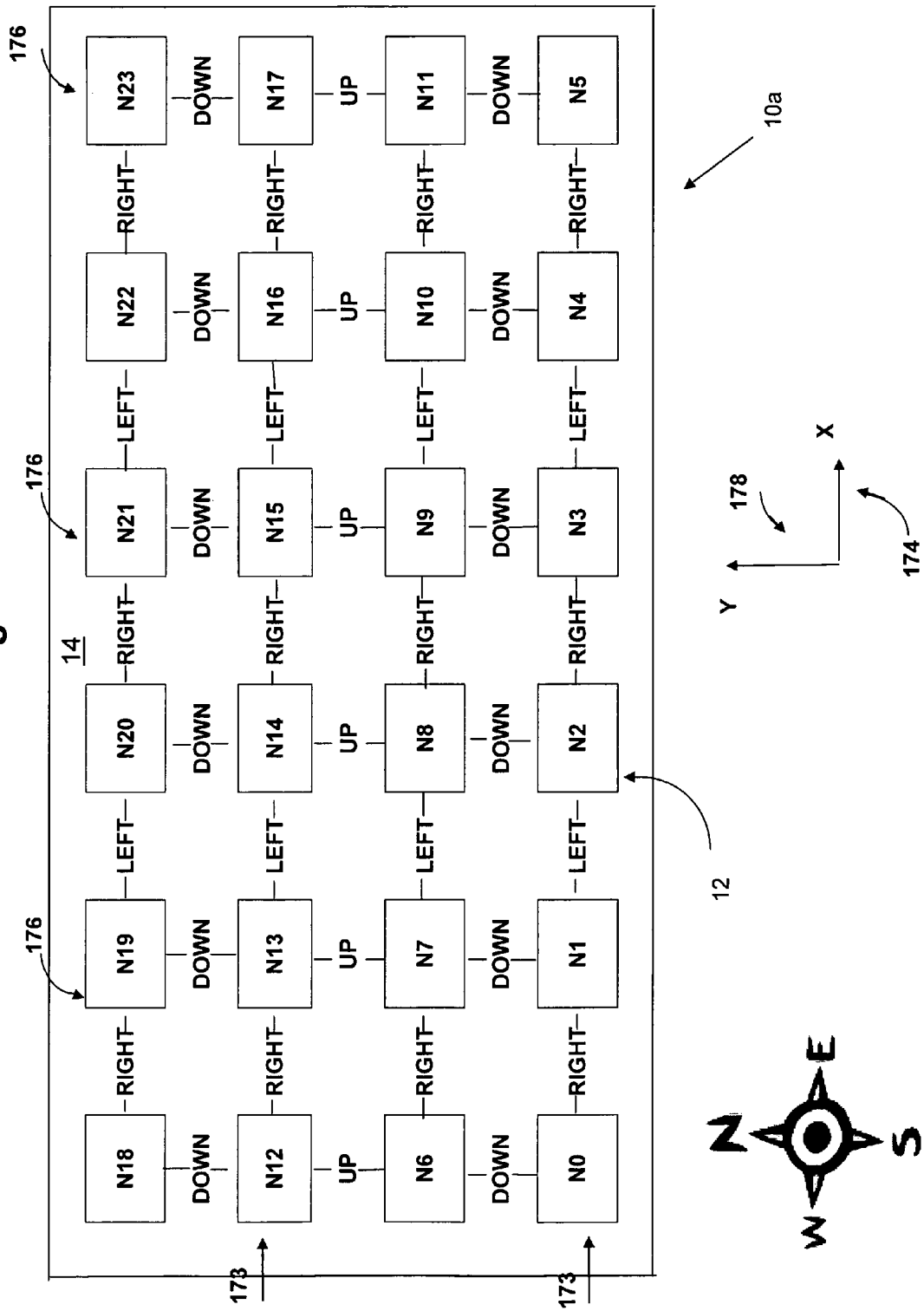
FIG. 9 is a diagrammatic view of the processor array of FIG. 1 with the processor or node identification and sharing ports with adjacent processors utilizing mirroring.

FIG. 9 is a block diagrammatic depiction of an alternative array 10a. In this example of the invention, the array 10a has twenty four (24) processors 12. Also, in this embodiment of the invention, the processors 12 are arranged in a particular relative orientation referred to as "mirroring". That is, the processors 12 in the second and fourth rows 173 from the top of the array 10a have been flipped about their x-axes 174, so that the down ports 38d are now facing upward. All of the processors 12 in the second, fourth, and sixth columns 176 with respect to the left side of the array 10a have been flipped about their y-axes 178, such that the right ports 38b are now facing towards the left side of the array 10. This results in processors N6, N8, N10, N18, N20 and N22 maintaining their original RDLU orientations; processors N0, N2, N4, N12, N14, and N16 having been flipped about their x-axes 174 only; processors N7, N9, N11, N19, N21, and N23 having been flipped about their y-axes 178 only; and nodes N1, N3, N5, N13, N15, and N17 having been flipped about both their x-axes 174 and their y-axes 178. With the exception of the processors 12 located at the corners and edges of the array 10a, these rotations result in all of the right ports 38b directly facing each other; all of the down ports 38d directly facing each other; all of the left ports 38c directly facing each other; and all of the up ports 38a directly facing each other. As will be discussed in greater detail hereinafter, this allows the processors 12 to directly align and connect with their nearest neighbor processors 12 because the interconnects of a processor 12 "mirror" the interconnects of an adjacent connecting neighbor processor 12.

In order to have a way to refer to directions within the array 10a that does not change according to which way the processors 12 therein are mirrored, the inventors have chosen to use the terminology North, South, East and West (NSEW) The directions of North, South, East, and West maintain their relative directions, even with mirroring. This is relevant during routing, which was previously described as sending a message from a processor 12 to another non-adjacent processor 12 through intermediary processors 12. Directions (NSEW) are in a table located in ROM 26.

Left ports 38c and up ports 38a do not connect to anything internal to the array 10a when they are on the outside border of the array 10a although, as discussed previously herein, they will probably connect to an external I/O port 39 (FIG. 1). Down ports 38d and right ports 38b always connect to another processor 12 so long as the number of rows and columns is an even number. As an example, processor N7 has four orthogonally adjacent neighbors, namely N6 which is connected to right port 38b, N1 which is connected to down port 38d, N8 which is connected to left port 38c, and N13 which is connected to the up port 38a. FIG. 9a is an expanded view of four nodes, namely N7, N8, N13, and N14 from FIG. 9, with right port 38b, down port 38d, left port 38c, and up port 38a notations.

Each processor 12 has an 18 bit I/O register 47, as shown in FIG. 3. Each I/O register 47 contains, inter alia, information as to whether an adjacent neighbor is reading from or writing to its ports 38. FIG. 10 is a partial view of an I/O register 47 for a processor 12. Bits B9 through B16 indicate the read and write status for a processor 12. The I/O register 47 contains the read and write handshake status bits 50 on its communication ports 38. These are read-only bits 50. By reading these, a processor 12 can see if a neighbor is inactive waiting to write to one of its ports 38 or is inactive waiting to read from one of its ports 38. If a neighbor is waiting to write to a processor 12, then the I/O register 47 write line status bit of processor 12 will go high, indicating that a write message from that particular neighbor is waiting to be sent. Likewise, if a neighbor is waiting to read from processor 12, then the I/O register 47 read line status bit of processor 12 will go high, indicating that a read message for that particular neighbor is waiting to be received.

The following example with reference to FIGS. 9, 9a, and 10 will further exemplify the above procedure. The I/O register 47 for Node 7 indicates the read and write status bits (B16 and B15, respectively) for the right port 38b, which is connected to processor N6 in this example. Bits B14 and B13 are the read and write status bits, respectively, for the down port 38d (connected to processor N1); bits B12 and B11 are the read and write status bits, respectively, for the left port 38c (connected to processor N8); and bits B10 and B9 are the read and write status bits, respectively, for the up port 38a (connected to processor N13). In this example, bits 16-9 always give the read and write status of adjacent nodes in the order of right, down, left, and up (RDLU). Another explanation of the I/O register 47 is as follows with continued reference to FIG. 10, which shows a partial I/O register for Node 7. If bit B16 is high, then there is a read request from processor N6; if bit B15 is high, then there is a write request from processor N6; if bit B14 is high, then there is a read request from processor N1; and so forth.

As discussed earlier, PAUSE causes a processor 12 to temporarily suspend its processing tasks or remain inactive in order to check for incoming data or instructions. There are two instances for using a PAUSE routine. The first instance occurs after a processor 12 becomes activated from a previous inactive state. The second instance occurs when a processor 12 is executing a program but takes a break, or pause, to look for an incoming message.

A NOP (also referred to as a "no-op") is a no operation instruction, and is designated by four dots ( . . . ) in the instruction code. With reference back to FIG. 4, a NOP may be used in the instance when using some or all of the available slots 54 might be unnecessary or undesirable. For example, in a message, four NOPs ( . . . ) are used as a message header, in part because it must be safe to throw away the header (as after being activated) and also safe to execute the header (as when already executing or taking a break from executing the processor's own code), both of which conditions are met by a NOP instruction. It also has to be safe for multiple messages to arrive from different directions generally simultaneously. When each message begins with four NOPs, a simultaneous reading of two or more different messages will not be catastrophic since each processor is reading the same message header.

Figure 11:
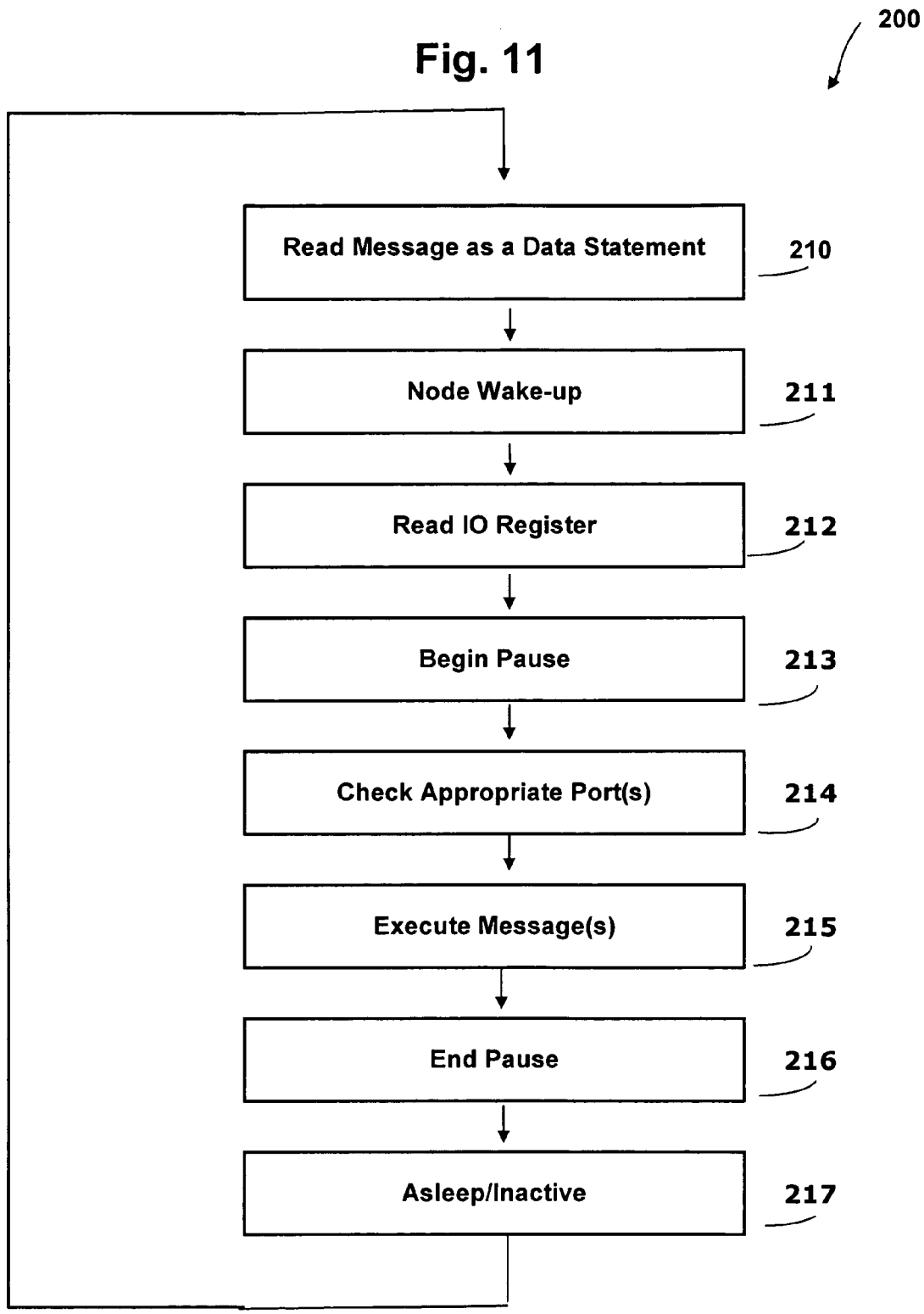
FIG. 11 is a flow diagram depicting a worker mode loop.

A processor 12 can be designated as primarily a worker or "production type" processor 12. In the absence of any other instructions, this processor 12 can become a worker by default, and perform a worker mode loop 200 as in FIG. 11, the loop being located in ROM. This worker processor 12 remains asleep or inactive until a message header containing four NOPS is sent to the worker processor 12 at the start of the worker mode loop 200. FIG. 11 is a flow diagram representing an example of a worker mode loop 200 which utilizes a PAUSE routine. When a worker processor 12 is inactive in a default worker mode loop 200 in ROM, the four NOPs of the message header are read as data in a "read message" operation 210. When the message arrives, a FETCH A instruction reads one word as data, which is four NOPs from a neighbor processor 12, which is placed into the T register 44 of the worker processor 12. Reading these four NOPS will wake up the worker processor 12, as indicated by a "wake up" operation 211 in the flow chart of FIG. 11. The "wake-up" message will activate the worker processor 12. As part of the worker mode loop 200, the contents or addresses of the B register 40b are pointed at the I/O register 47 as a default setting, and therefore a FETCH B instruction will read the contents of the I/O register 47 in a "read I/O register" operation 212 to determine from which port the message was sent.

In a "begin pause" operation 213, the worker processor 12 is absent of any processing activities, in order to prepare for the next step of "check the appropriate port(s)" operation 214, according to the contents of the I/O register 47 that were read in the previous step 212. The step of "execute message(s)" operation 215 from the appropriate port(s) occurs next. After all of the incoming message(s) have been executed, PAUSE will end in an "end pause" operation 216. At this point, the worker processor 12 will become inactive in an "asleep/inactive" operation 217, and wait until another message header arrives to activate or wake the worker processor 12.

In summary, all worker processors 12 sleep and PAUSE. The worker processor 12 sleeps, wakes up and reads the I/O register 47 where all neighbor processor 12 write requests are checked, begins PAUSE, and then executes the incoming message. At the end of an incoming message, there is a return (;), or a JUMP to a port 38 with a return (;). The worker processor 12 then goes back to the PAUSE routine, checks the next bit in the I/O register 47 for another message, executes the message, if any, then returns to the worker loop and goes to sleep waiting for more messages.

Messages are treated as tasks. PAUSE treats incoming messages that are present as waking tasks, and treats ports 38 with nothing on them as sleeping tasks.

Figure 12:
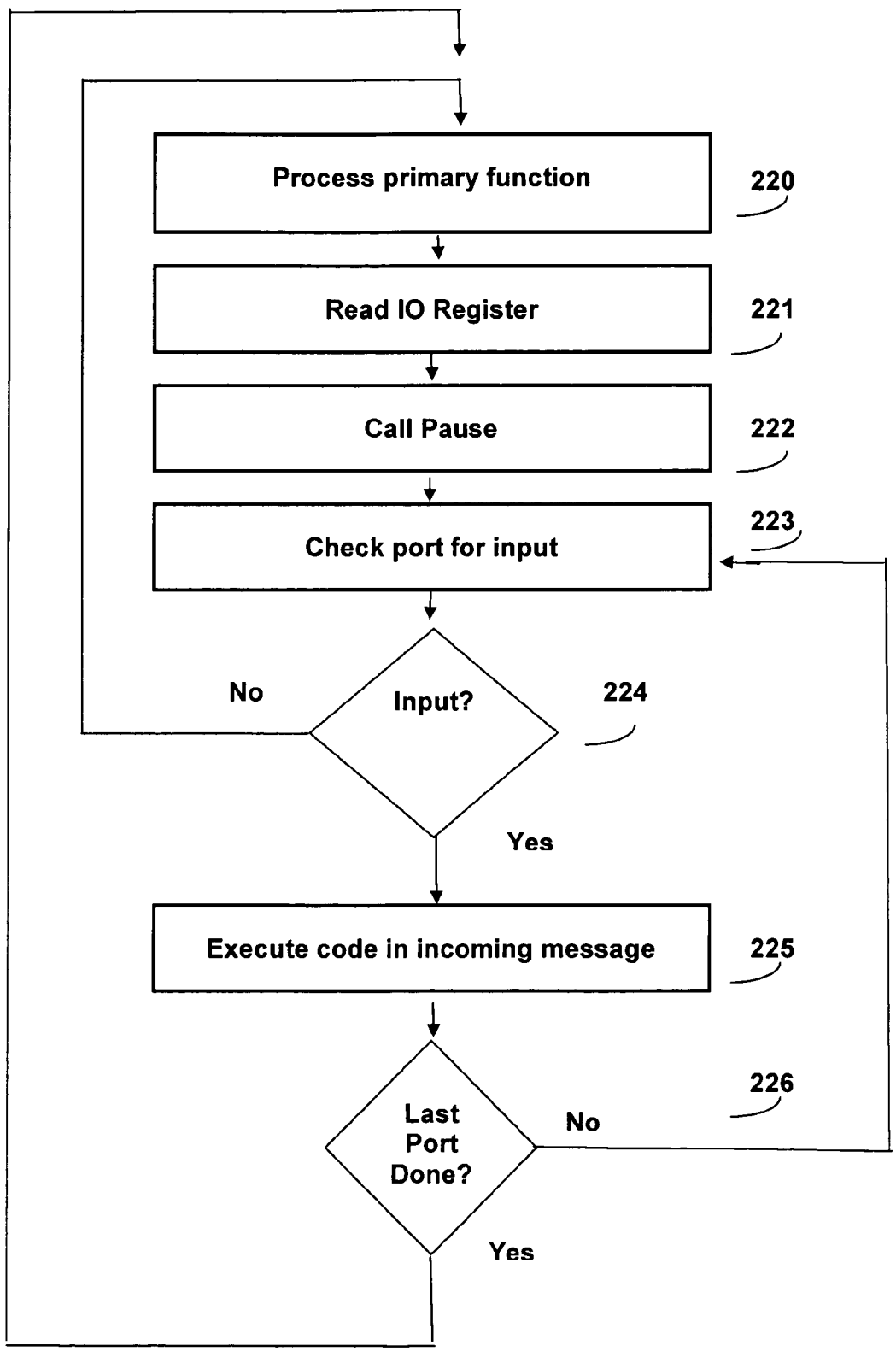
FIG. 12 is a flow diagram depicting an executing processor with a PAUSE routine.

The second occurrence of using PAUSE is shown in FIG. 12, where a processor 12 is "processing a primary function" operation 220. From time to time, the processor 12 will check the I/O register 47 in a "read I/O register" operation 221 to check the incoming status of adjacent processors 12. If the I/O register 47 indicates that there is an incoming message, then the processor 12 will PAUSE in a "call pause" operation 222. The processor 12 will then check the port 38 which was indicated by the I/O register 47 in a "check port for input" operation 223. If there is a message at the designated port 38 as indicated in an "input?" decision operation 224, then the processor 12 will "execute all the code in the incoming message" operation 225, including the four NOPs. After executing the incoming message, there is a "last port done?" decision operation 226 made as to whether there are other ports 38 waiting to send a message. If other port(s) need to be checked for possible input, then operations are repeated starting at step 223 with a "check port for input" operation. If there is no input there, as indicated by decision 224, the processor 12 will go back to its original task (step 220)—it will never go to sleep under those conditions. After checking all ports 38 in the order of right, down, left, and up (RDLU) for incoming messages and executing any code, the last port will be done (step 226), and the processor 12 will return to its original primary function at step 220.

Most of the time, communicated sequential processes on different processors 12 is performed by a group of processors 12. If an adjacent processor 12 is not ready to accept a message, then the transmitting processor 12 will go to sleep, or work on another task and will need to poll the I/O register 47 to look for messages. However, most of the time when a group is doing communicated sequential processes on different processors 12, a processor 12 just writes to a port 38 and the adjacent processor 12 just reads from its port 38. A read from all four ports 38 can be performed by a processor 12, then the processor 12 goes to sleep until any one of the four neighbor processors 12 writes; the reading processor 12 needs to check the I/O register 47 to see which processor 12 wrote after being awakened. That processor 12 wakes up with a data read. The processor 12 can read with the A register 40a (data) or the B register 40b (data), or the P register 40c (data or code); reading a whole message with the P register 40c means it will execute an entire message including the four NOPs.

A processor 12 can read all four ports 38 as a worker, then go to sleep if no message is waiting (FIG. 11). If a processor 12 is busy doing a task (loop), then a PAUSE call can be worked into a task ring to suspend the first task. The main task will be suspended and it will read the four ports 38 which adds four more tasks to the task ring, then it goes back to the main suspended task (FIG. 12).

Processors with I/O pins connected have bits in the I/O port 39 that set and show the status of those pins. Some pins are read-only and can be read by reading a bit in an I/O port 39. Some pins are read/write and can be read or written by reading or writing bits in the I/O register 47. After a read or write has been completed, the handshake signals are gone and are not readable in the I/O register 47. Pins connected to the wake-up pin handshake circuit of an unconnected port will not be visible in the I/O register 47. If an address that includes a wake-up pin is read, then the processor 12 will wake up when a signal appears on the pin, but if the I/O register 47 is read, then the processor 12 won't see the wake-up handshake. A pin wake-up is connected only to the wake-up circuit, not to the I/O register 47. Therefore, a pin has to be read directly to know if the pin awakened the processor 12. If the pin reads as 0 (zero), then one of the other ports 38 awakened the processor 12. This is how the ROM code in the serial worker processor functions.

Serial processors have their serial input pin connected to an I/O register bit (bit 17) where they can be read as data, but they are also connected to the handshake line of an unconnected corn port. A processor 12 that reads that unconnected corn port will wake up when data on the pin tells the processor 12 that a write to the pin or phantom port is taking place. When a real port 38 is read, the processor 12 will sleep until it gets the write handshake signal and will then wake up reading the data. The ROM code distinguishes between a processor 12 being awakened by a pin and being awakened by a port 38 by reading the pin after the processor 12 is awake. If the pin is low, the processor 12 reads the I/O register 47 and pauses. If the pin is high, the processor 12 performs serial boot code.

When a read or write is started, a read or write handshake bit is raised. When the paired read or write handshake bit is raised by the other processor 12, all bits raised by that processor 12 are lowered, the processors 12 wake up, and the data is transferred. After the data is transferred, any read/write handshake flag bits that were raised are lowered.

If a processor 12 JUMPs to RDLU (the name of the address of four neighbor ports 38), it tries to read and raises read flags on all four ports 38. It then goes to sleep in essentially a no power mode. When a neighbor(s) writes to one or more of these ports 38 and raises the write flag(s), all port 38 flags are reset and the first processor 12 wakes up. The same thing happens if the processor 12 reads the address using the A register 40a or the B register 40b and a data FETCH or STORE. It goes to sleep until one of the four (or three or two) neighbors wakes it up with data.

If a wake-up pin is read as part of an address four port 38 read and the pin is not high, then the processor 12 knows that the wake-up came from one of the other three neighbors. Serial boots in ROM on serial boot processors 12 come from a pin which wakes up the processor 12; if the pin is high, then code is loaded from the serial pin and booted by the processor 12.

There is a path of recommended routes that won't conflict with anything by using X0 packets. X0 stands for execute on the 0 node of the RAM server; messages headed for node 0 on certain paths are defined in ROM. One must not route messages against each other. PAUSE allows messages to be routed safely. A RAM server buffer (on node 6, a node next to the RAM server) allows incoming messages to node 0 of the RAM server to be buffered in RAM on node 6 so that they do not back up and block messages sent out from the RAM server. This is the recommended routing path that doesn't conflict with X0.

It is important to realize that what is being described here is "cooperative multi-tasking" between several processors 12. A set of tasks resides on a port 38 or ports 38 and local memory. FETCH B and PAUSE will sequentially examine all ports 38 for incoming executable code and treat ports 38 as tasks. Instructions on a port 38 can be executed directly from the port 38 without loading into the processor's RAM first.

Although the PAUSE routine between multiple processors 12 has been disclosed herein with reference to Forth, all of the concepts of the PAUSE routine between multiple processors 12 could be applied to other programming languages as well.

All of the above examples are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

We claim:

1. A method for communicating between a plurality of computers, said method comprising:
   providing a first computer having a processor, a memory, and at least one communication port;
   providing a second computer having a processor, a memory, and at least one communication port, said memory of said second computer including a first program of instructions;
   executing said first program with said second computer;
   receiving an indication of a second program of instructions at said communication port of said second computer by checking the value of at least one bit at least partially controlled by said first computer against a predetermined value, said second program output from said communication port of said first computer;
   continuing said executing of said first program with said second computer following said receiving said indication of said second program;
   pausing said executing of said first program if the value of said at least one bit matches said predetermined value, said pausing responsive to at least one of said instructions of said first program;
   executing said second program with said second computer;
   pausing said executing of said second program responsive to one of said instructions of said second program; and
   resuming execution of said first program with said second computer; and wherein
   said receiving said indication of said second program does not cause an interrupt in processing functions of said second computer.

2. The method of claim 1, wherein:
   said indication of said second program comprises a write function from said first computer to said second computer.

3. The method of claim 1, wherein:
   each of said plurality of computers comprises a plurality of communication ports.

4. The method of claim 3, wherein:
   each of said plurality of computers further comprises an input/output (I/O) register.

5. The method of claim 4, wherein:
   each of said input/output (I/O) registers comprises read and write status bits.

6. The method of claim 5, wherein:
   checking the value of at least one bit against a predetermined value includes checking the status of at least one of said read and write status bits.

7. The method of claim 1, wherein:
   said plurality of computers comprises an array of computers provided on a die.

8. The method of claim 7, further comprising:
   sending said second program to said second computer via a data bus between said communication port of said first computer and said communication port of said second computer.

9. The method of claim 7, wherein:
   said array of computers comprises at least one interior computer with four adjacent neighboring computers.

10. The method of claim 7, wherein:
    said array of computers comprises at least one computer situated on the perimeter of said array, and wherein said at least one computer further comprises a connection to an input/output (I/O) pin and further comprises an input/output (I/O) status bit.

11. A method of sharing processing tasks between a plurality of computers, said method comprising:
providing a first computer having a processor, a memory, and at least one communication port;
providing a second computer having a processor, a memory, and at least one communication port, said memory including a first program of instructions;
providing a data bus between said communication port of said first computer and said communication port of said second computer;
executing said first program with said second computer;
receiving an indication of a second program of instructions at said communication port of said second computer by checking the value of at least one bit at least partially controlled by said first computer against a predetermined value;
continuing said executing of said first program with said second computer following said receiving said indication of said second program;
pausing said executing of said first program if the value of said at least one bit matches said predetermined value, said pausing responsive to at least one of said instructions of said first program;
receiving said second program on said data bus with said second computer, said second program received from said first computer; and
executing said second program with said second computer; and wherein
said receiving said indication of said second program does not interrupt the processing functions of said second computer.

12. The method of claim 11, wherein:
said receiving said second program is completed when said second computer temporarily pauses said executing and accepts said second program from said first computer.

13. The method of claim 11, wherein:
said receiving said indication of said second program comprises setting an input flag bit high.

14. The method of claim 11, wherein:
said executing said second program with said second computer comprises executing said instructions of said second program directly from communication port of said second computer.

15. The method of claim 14, wherein:
said executing said instructions of said second program directly from said port is performed in the absence of storing said instructions to a memory location prior to said executing said instructions directly.

16. A processing system, comprising:
an array of interconnected computers, wherein each computer further comprises:
a processing unit;
a memory for storing a program of instructions;
an I/O register;
a plurality of communication ports;
a sending mechanism for sending an output to at least one receiving computer;
a receiving mechanism for receiving an input from at least one sending computer;
a monitoring mechanism in which said computer can determine the source of said input; and
an executing mechanism in which said computer can execute said program in said memory and respond to said input; and wherein said monitoring mechanism is operative to indicate that said at least one sending computer is ready to send said input based on the value of at least one bit at least partially controlled by said sending computer;
said executing mechanism, responsive to at least one instruction in said program, is operative to suspend execution of said program if said at least one bit at least partially controlled by said sending computer matches a predetermined value; and
said executing mechanism, responsive to said receiving mechanism receiving said input and a second program in said input, is operative to execute said second program after execution of said program is suspended.

17. The system of claim 16, wherein:
said sending mechanism comprises a first port located adjacent to said at least one receiving computer; and
said receiving mechanism comprises a second port located adjacent to said at least one sending computer.

18. The system of claim 17, wherein:
said receiving mechanism further comprises a latching mechanism to latch said input directly from said second port.

19. The system of claim 16, wherein:
said input is received directly from a communication port of said at least one sending computer.

20. The system of claim 16, wherein:
said sending mechanism is operative to send said output to a non-adjacent receiving computer.

21. The method of claim 1, wherein said second computer includes a plurality of communication ports, said method further comprising:
prior to pausing said executing of said second program, receiving an indication of a third program of instructions on a second one of said plurality of communication ports of said second computer; and
after pausing said executing of said second program, executing said third program with said second computer.

22. The method of claim 21, further comprising:
pausing said executing of said third program responsive to one of said instructions of said third program; and
resuming execution of said first program with said second computer following said pausing said executing of said third program.

23. The method of claim 1, wherein:
checking the value of at least one bit against said predetermined value includes reading the contents of an input/output (I/O) register of said second computer responsive to at least one of said instructions of said first program;
said I/O register includes a plurality of read and write status bits;
said second computer includes a plurality of communication ports; and
respective pairs of said read and write status bits each correspond to one of said plurality of communication ports of said second computer.

24. The method of claim 23, further comprising:
determining, based on said contents of said I/O register, which one of said plurality of communication ports of said second computer is associated with said indication of said second program.

25. The method of claim 1, wherein:
said executing said second program with said second computer comprises executing said instructions of said second program directly from said communication port of said second computer.

26. The method of claim 11, further comprising:
pausing said executing of said second program responsive to one of said instructions of said second program; and
resuming execution of said first program with said second computer.

27. The method of claim 26, further comprising:
prior to pausing said executing of said second program, receiving an indication of a third program of instructions on a second communication port of said second computer; and
after pausing said executing of said second program, executing said third program with said second computer.

28. The method of claim 27, further comprising:
pausing said executing of said third program responsive to one of said instructions of said third program; and
resuming execution of said first program with said second computer following said pausing said executing of said third program.

29. The method of claim 11, wherein:
checking the value of at least one bit against said predetermined value includes reading the contents of an input/output (I/O) register of said second computer responsive to at least one of said instructions of said first program;
said I/O register includes a plurality of read and write status bits;
said second computer includes a plurality of communication ports; and
respective pairs of said read and write status bits each correspond to one of said plurality of communication ports of said second computer.

30. The method of claim 29, further comprising:
determining, based on said contents of said I/O register, which one of said plurality of communication ports of said second computer is associated with said indication of said second program.

31. The system of claim 16, wherein:
said executing mechanism, responsive to an instruction in said second program, is operative to suspend execution of said second program;
said monitoring mechanism is operative to provide an indication that a second sending computer is ready to send another said input; and
said executing mechanism, responsive to said receiving mechanism receiving said another input and a third program in said another input, is operative to execute said third program.

32. The system of claim 16, wherein:
said monitoring mechanism includes a register having a plurality of read and write status bits; and
respective pairs of said read and write status bits each correspond to one of said plurality of communication ports of said computer.

33. The system of claim 16, wherein:
said executing mechanism is operative to execute said second program directly from one of said plurality of communication ports.

34. The method of claim 1, further comprising:
checking the value of said at least one bit at least partially controlled by said first computer against said predetermined value a second time after said step of resuming execution of said first program; and
pausing said executing of said first program a second time if the value of said at least one bit matches said predetermined value, said pausing responsive to at least one of said instructions of said first program.

35. The method of claim 11, further comprising:
checking the value of said at least one bit at least partially controlled by said first computer against said predetermined value a second time after said step of resuming execution of said first program; and
pausing said executing of said first program a second time if the value of said at least one bit matches said predetermined value, said pausing responsive to at least one of said instructions of said first program.

* * * * *